(12) United States Patent
Monnier et al.

(10) Patent No.: US 11,631,876 B2
(45) Date of Patent: Apr. 18, 2023

(54) CO-ELECTROLESS DEPOSITION METHODS FOR FORMATION OF METHANOL FUEL CELL CATALYSTS

(71) Applicant: UNIVERSITY OF SOUTH CAROLINA, Columbia, SC (US)

(72) Inventors: John R. Monnier, Columbia, SC (US); Gregory L. Tate, Columbia, SC (US); Wen Xiong, Columbia, SC (US); Benjamin H. Meekins, Columbia, SC (US)

(73) Assignee: University of South Carolina, Columbia, SC (US)

( * ) Notice: Subject to any disclaimer, the term of this patent is extended or adjusted under 35 U.S.C. 154(b) by 333 days.

(21) Appl. No.: 16/748,945

(22) Filed: Jan. 22, 2020

(65) Prior Publication Data

US 2020/0313214 A1 Oct. 1, 2020

Related U.S. Application Data

(60) Provisional application No. 62/826,148, filed on Mar. 29, 2019.

(51) Int. Cl.
*H01M 8/1011* (2016.01)
*H01M 4/92* (2006.01)
*H01M 4/86* (2006.01)

(52) U.S. Cl.
CPC ....... *H01M 8/1011* (2013.01); *H01M 4/8621* (2013.01); *H01M 4/921* (2013.01); *H01M 4/926* (2013.01)

(58) Field of Classification Search
None
See application file for complete search history.

(56) References Cited

U.S. PATENT DOCUMENTS

| | | | |
|---|---|---|---|
| 4,748,144 A | 5/1988 | Monnier et al. | |
| 5,081,096 A | 1/1992 | Monnier et al. | |
| 6,409,939 B1 * | 6/2002 | Abdo | C01B 3/583 |
| | | | 252/373 |
| 10,016,751 B2 | 7/2018 | Monnier et al. | |
| 2005/0075240 A1 * | 4/2005 | Yamamoto | H01M 4/921 |
| | | | 502/185 |
| 2007/0105007 A1 | 5/2007 | Regalbuto et al. | |

(Continued)

OTHER PUBLICATIONS

Bartholomew, et al. "Fundamentals of Industrial Catalytic Processes" *John Wiley & Sons, Inc.* (2006) pp. 274-286.

(Continued)

*Primary Examiner* — Tracy M Dove
(74) *Attorney, Agent, or Firm* — Dority & Manning, P.A.

(57) ABSTRACT

The present disclosure is directed to compositions and structures of supported metal catalysts for use in applications such as direct methanol fuel cells. Generally, implementations include supported metal catalysts that include Pt active sites that have been modified by addition or co-localization of a second metal such as Cu, Co, Ni, and/or other base metals to lower the inhibiting effect of strongly-adsorbed CO, an intermediate of methanol oxidation. An example aspect of the present disclosure includes catalyst compositions where the exterior metal sites in the supported catalyst include at least two metals: Pt and a competitive binder (e.g., a second metal).

15 Claims, 24 Drawing Sheets

(56) References Cited

U.S. PATENT DOCUMENTS

| | | | |
|---|---|---|---|
| 2007/0244003 A1* | 10/2007 | Majima | H01M 4/9083 502/344 |
| 2009/0117257 A1 | 5/2009 | Monnier et al. | |
| 2009/0220682 A1 | 9/2009 | Monnier et al. | |
| 2014/0171290 A1* | 6/2014 | Lopez | B01J 37/08 502/182 |
| 2016/0136632 A1 | 5/2016 | Monnier et al. | |
| 2016/0226073 A1* | 8/2016 | Tong | H01M 4/925 |
| 2018/0047993 A1* | 2/2018 | Inaba | H01M 4/88 |
| 2019/0280309 A1* | 9/2019 | Steinbach | B01J 23/892 |

OTHER PUBLICATIONS

Beard, et al. "Preparation and structural analysis of carbon-supported Co core/Pt shell electrocatalysts using electroless deposition methods" *ACS Nano* 3(9) (2009) pp. 2841-2853.

Conte, et al. "Modifications of the metal and support during the deactivation and regeneration of Au/C Catalysts for the hydrochlorination of acetylene" *Catal. Sci. Technol.* 3 (2013) pp. 128-134.

Corgnale, et al. "Solar hydrogen production by the hybrid sulfur process" *Int 'l J. Hydrog. Energy* 36 (2011) 11604-11619.

Corgnale, et al. "Solar hybrid sulfur cycle water-splitting process" SRNL-STI-2015e00546 Rev 0 (2015).

De Falco, et al. "$CO_2$: A Valuable Source of Carbon" *Green Energy Techn. Ser.* Springer (2013) pp. 1-202.

Djokić, S.S. "Modern Aspects of Electrochemistry—Ch. 2: Electroless deposition of metals and alloys" *Springer* No. 35 (2002) pp. 51-133. (Abstract Preview only).

Er-Rbib, et al. "Production of synthetic gasoline and diesel fuel from dry reforming of methane" *Energy Proc.* 29 (2012) pp. 156-165.

Ertl, et al. "Handbook of Heterogeneous Catalysis" *Wiley-VCH* (1997) pp. 1-386.

Garrick, et al. "The Effect of the Surface Composition of Ru—Pt Bimetallic Catalysts for Methanol Oxidation" *Electrochem. Acta* 195 (2016) pp. 106-111.

Ginosar, et al. "Stability of supported platinum sulfuric acid decomposition catalysts for use in thermochemical water splitting cycles" *Int'l J. Hydrog. Ener.* 32 (2007) pp. 482-488.

Hao, et al. "A fundamental study of Pt adsorption onto carbon: Adsorption equilibrium and particle synthesis" *J. Catal.* 279 (2011) pp. 48-65.

Luo, et al. "Probing the magic numbers of alumina-magnesium cluster anions and their reactivity toward oxygen" *J. Am. Chem. Soc.* 135 (2013) pp. 4307-4313.

Mezey, et al. "The surface free energies of solid chemical elements: Calculations from internal free enthalpies of atomization" *Jap. J. Appl. Phys.* 21 (1982) pp. 1569-1571.

Navarro, et al. "Renewable syngas production via dry reforming of methane by $CO_2$: A valuable source of carbon" *Green Energy Techn. Ser.* Springer (2013) pp. 45-66.

NSF. "Catalyzing Commercialization: Creating Novel Bimetallic Catalysts for Methanol Fuel Cells" *CEP* (2019) p. 14.

O'Connell, et al. "The Curious Relationship of Sintering to Activity in Supported Gold Catalysts for the Hydrochlorination of Acetylene" *Appl. Catal. B: Environ.* 225 (2017) pp. 264-272.

O'Connell, K. "Characterization, Synthesis and Stabilization of Au Based Bimetallic Catalysts for the Hydrochlorination of Acetylene" *U. South Carolina* (2016) pp. 1-121.

O'Connell, et al. "Surface Free Energy Stabilization of Au Shells over Noble Metal Cores for the Hydro-dechlorination of Acetylene" *251st ACS Meeting* (Mar. 2016).

O'Connell, et al. "Controlling Au Particle Sintering During the Hydrochlorination of Acetylene Using Core-Shell Bimetals" *24th N. Am. Catal. Soc. Meet.* (2015) p. 1.

O'Keefe, et al. "Catalysis research in thermochemical water-splitting processes" *Catal. Rev. Sci. Eng.* 22(3) (1980) pp. 325-369. (Abstract only).

Ohno, et al. "Anodic oxidation of reductants in electroless plating" *J. Electrochem. Soc.* 132 (1985) pp. 2323-2330.

Overbury, et al. "The surface composition of binary systems. Prediction of surface phase diagrams of solid solutions" *Chem. Rev.* 75(5) (1975) pp. 547-560.

Petkovic, et al. "$Pt/TiO_2$ (rutile) catalysts for sulfuric acid decomposition in sulfur-based thermochemical water-splitting cycles" *Appl. Catal. A: Gen.* 338 (2008) pp. 27-36.

Rashkeev, et al. "Catalytic activity of supported metal particles for sulfuric acid decomposition reaction" *Catal. Today* 139 (2009) pp. 291-298.

Rebelli, et al. "Preparation and characterization of silica-supported, Group IB—Pd bimetallic catalysts prepared by electroless deposition methods" *Catal. Today* 160 (2011) pp. 170-178.

Reber, et al. "Effect of N- and P-Type Doping on the Oxygen-Binding Energy and Oxygen Spillover of Supported Palladium Clusters" *J. Phys. Chem.* 118 (2014) pp. 20306-20313.

Reber, et al. "Cooperative effects in the oxidation of CO by palladium oxide cations" *J. Chem. Phys.* 135:234303 (2011) pp. 1-7.

Regalbuto, J.R. "Synthesis of Solid Catalysts—Ch. 3: Electrostatic Adsorption" *Wiley-VCH* (2009).

Roach, et al. "Crystal field effects on the reactivity of aluminum-copper cluster anions" *Phys. Rev. B* 81:195404 (2010) pp. 1-5.

Roach, et al. "Complementary active sites cause size-selectivity of aluminum cluster anions with water" *Science* 323 (2009) pp. 492-495.

Schaal, et al. "Characterization and evaluation of $Ag—Pt/SiO_2$ catalysts prepared by electroless deposition" *J. Catal.* 254 (2008) pp. 131-143.

Skriver, et al. "Surface energy and work function of elemental metals" *Phys. Rev. B* 46(11) (1992) pp. 7157-7168.

Tate, et al. "Preparation of Pt-containing bimetallic and trimetallic catalysts using continuous electroless deposition methods" *Catalysis Today* 334 (2019) pp. 113-121.

Wittanadecha, et al. "Preparation of Au/C catalysts using micro wave-assisted and ultrasonic-assisted methods for acetylene hydrochlorination" *Appl. Catal A: Gen.* 475 (2014) pp. 292-296.

Wongkaew, et al. "Characterization and evaluation of Pt—Pd electrocatalysts prepared by electroless deposition" *Appl. Catal. B: Environ.* 188 (2016) pp. 367-375.

Zhang, et al. "Selective hydrogenation of acetylene in excess ethylene using Ag— and $Au—Pd/SiO_2$ bimetallic catalysts prepared by electroless deposition" *Appl. Cat. A: Gen.* 469 (2014) pp. 419-426.

Zhang, et al. "Progress on cleaner production of vinyl chloride monomers over non-mercury catalysts" *Front. Chem. Sci. Eng.* 5(4) (2011) pp. 514-520.

\* cited by examiner

$Pt_{0.63}Cu$ Continuous Co-ED

Pt$_{0.34}$Cu Continuous Co-ED

$Pt_{0.31}Cu$ Continuous Co-ED

Pt$_{0.18}$Cu Continuous Co-ED

CO-ELECTROLESS DEPOSITION METHODS FOR FORMATION OF METHANOL FUEL CELL CATALYSTS

CROSS REFERENCE TO RELATED APPLICATIONS

The present application claims priority to U.S. Provisional Application No. 62/826,148, having a filing date of Mar. 29, 2019, the disclosure of which is incorporated herein by reference in its entirety.

STATEMENT AS TO RIGHTS TO INVENTIONS MADE UNDER FEDERALLY SPONSORED RESEARCH

This invention was made with Government support under Grant No. 1511615, awarded by the National Science Foundation. The Government has certain rights in the invention.

BACKGROUND

Catalyst design is highly important in developing new applications and improving catalyst durability. For example, multi-metal catalyst systems can be used to take advantage of preferable binding for certain elements to certain metals. Controlled deposition or other growth techniques may be used to design catalysts having a certain morphology or arrangement of metal sites at a surface or binding region of the catalyst. Needed in the art are improved methods to produce such catalyst systems that may display properties such as better selectivity, activity, and/or yield compared to single metal systems. While bimetallic catalysts represent a real opportunity to improve stability, bimetallic catalysts are typically prepared using either successive impregnation or co-impregnation methods. Unfortunately, these traditional methodologies provide inadequate control over metal placement and, accordingly, yield catalysts containing both isolated monometallic particles and bimetallic particles with varying compositions. This complex mixture of particles results in poor control of the final catalyst performance and makes any definitive correlations between catalyst performance, catalyst stability, and catalyst composition virtually impossible. However, electroless deposition (ED) produces controlled-composition bimetallic catalysts. Electroless deposition is a catalytic or autocatalytic process whereby a chemical reducing agent reduces a metallic salt onto specific sites of a pre-existing surface of a core metal particle. This targeted deposition results in the formation of only bimetallic catalysts, and not the wide range of compositions associated with current methods of catalyst preparation. Parameters of electroless deposition include selection of a reducing agent, such as formaldehyde, borohydride salts, amine boranes, hydrazine, and sodium hypophosphite, the reducible metal salt or salts in solution, and/or the pre-existing catalytic, core metal surface. For example, formaldehyde (HCHO) can be used as the reducing agent to deposit Cu salts on Pd surfaces, Ag salts on Pt surfaces, and Au salts on Pt surfaces to form bimetallic particles containing both metals at the surface of the bimetallic catalysts. Dimethylamine borane (DMAB) has also been used as a reducing agent to electrolessly deposit $(PtCl_6)^{2-}$ as Pt metal on both carbon-supported Rh and Pd catalysts to produce bimetallic Pt—Rh and Pt—Pd bimetallic particles for use as improved PEM fuel cells.

The ability to prepare a wide range of Pt-containing, bimetallic catalysts using co-electroless deposition provides a pathway to prepare multiple families of compositions for direct methanol fuel cell catalysts that will alleviate the strong kinetic inhibition effect of CO strongly adsorbed on surface Pt sites. This will increase activities and increase the viability of methanol as a feed for fuel cells, particularly in mobile sources such as automobiles and refueling stations.

If fuel cells are ever to be used for motorized vehicles, methanol, rather than compressed $H_2$, will likely be preferred because of ease and safety of handling and the ability to quickly add methanol to standard gasoline refueling stations.

SUMMARY OF THE INVENTION

The present disclosure is directed to compositions and structures of supported metal catalysts for use in applications such as direct methanol fuel cells. Implementations according to the present disclosure include supported metal catalysts that include Pt active sites that have been modified by addition or co-localization of a second metal, such as Cu, Co, Ni, Ru and/or other base metals, to lower the inhibiting effect of strongly-adsorbed CO, an intermediate formed during methanol oxidation. One example aspect of the catalyst can include a structure such as a core-shell arrangement, where one metal is present primarily in an interior or core of the structure, and one or more metals are primarily at an exterior or shell of the structure. Benefits of such an arrangement can include improved stability. An exemplary aspect of the present disclosure includes compositions where the exterior or shell metal sites in the supported catalyst include at least two metals: Pt and a competitive binder (e.g., a second metal). Advantages of this arrangement include higher concentrations of bimetallic sites that may lead to both improved activity and stability when compared to single metal or other poorly mixed bimetallic systems. While current methanol fuel cells are generally used for room temperature applications, implementations according to the present disclosure may provide improved stability for high-temperature applications. Further, since increasing the operating temperature can also improve fuel cell efficiency, implementations according to the present disclosure may provide new applications for methanol fuel cell compositions.

Surprisingly, certain implementations according to the present disclosure can display mass activities (relative to the weight of platinum) of about 3 to about 9 times higher when compared to platinum only systems. Further, example implementations can display electrochemical properties that demonstrate greater than 90% increase in peak current. These improvements over current catalyst materials can open new applications to methanol fuel cells and provide a significant advancement in fuel cell catalysts.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures.

Figure 1:
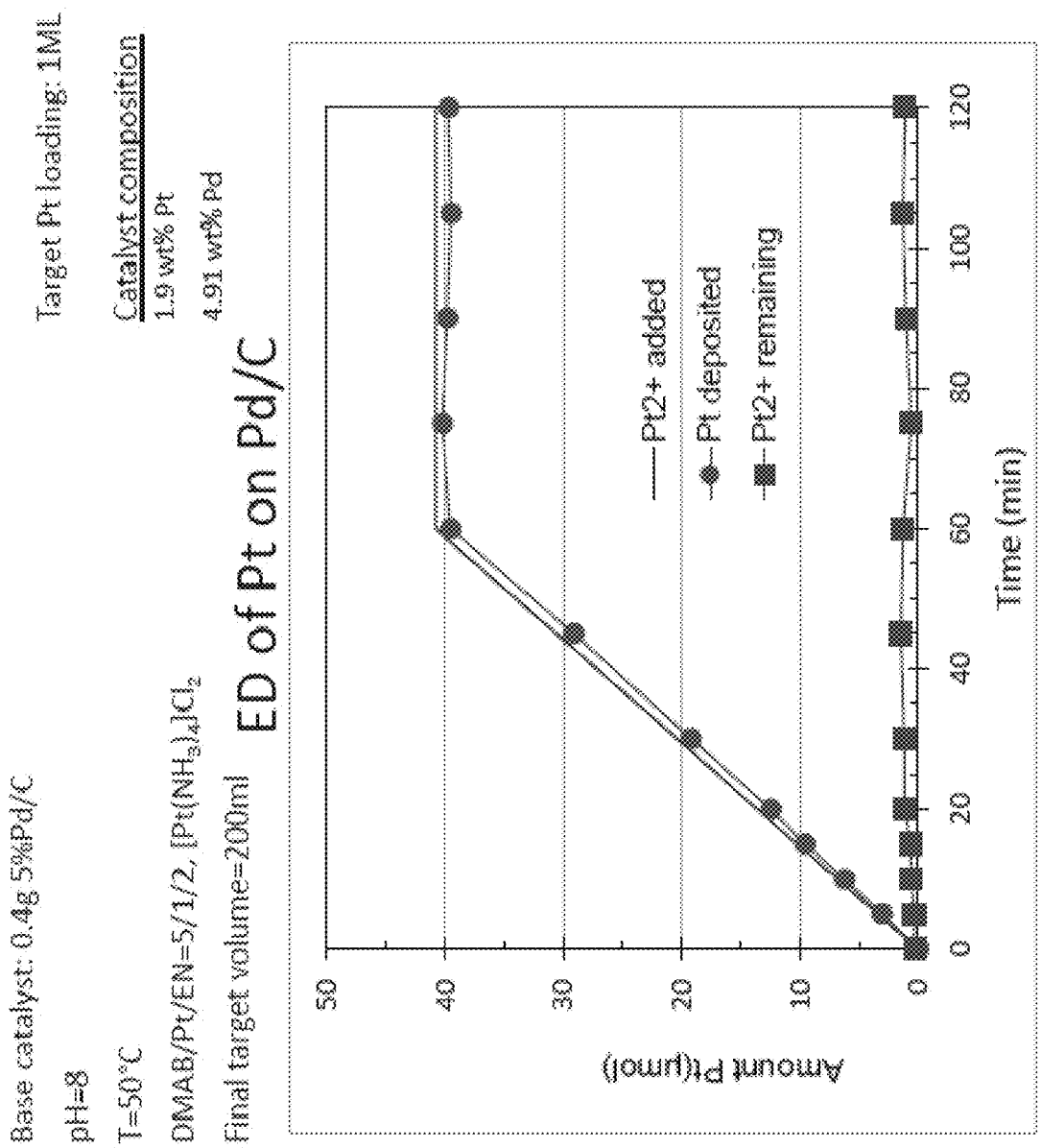
FIG. 1 illustrates a graph displaying deposition of platinum (Pt) according to example implementations.
Figure 2A:
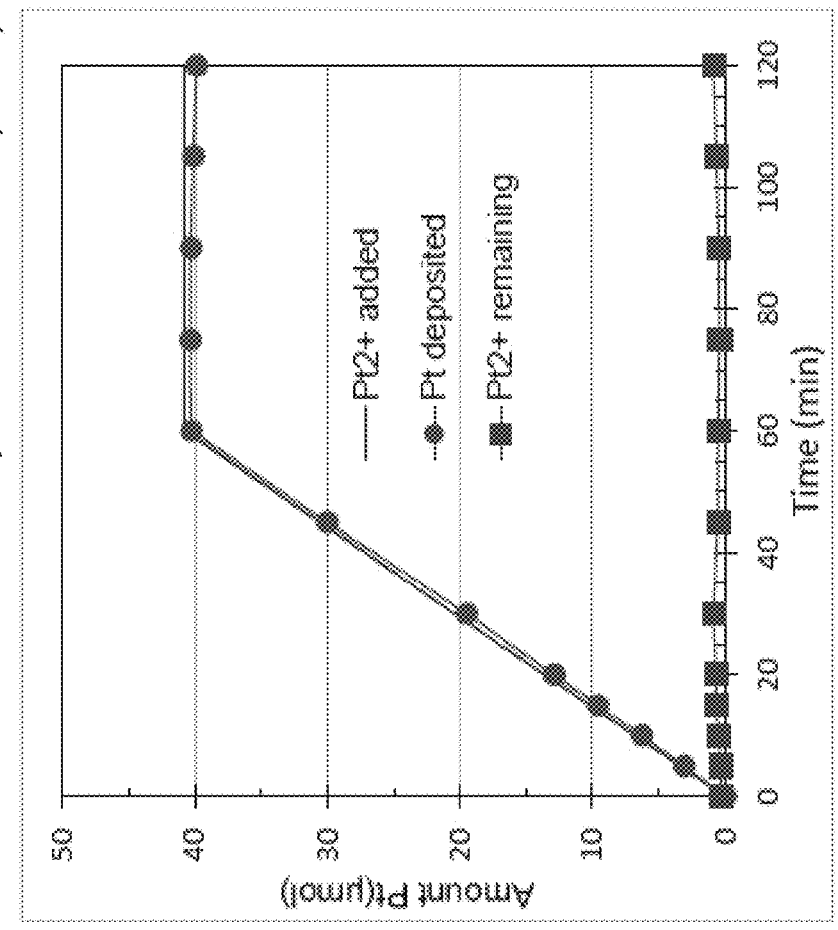
FIGS. 2A-2B illustrate example graphs displaying the deposition of platinum (Pt) and nickel (Ni), respectively, according to example implementations, at a 1:1 Pt:Ni ratio.
Figure 2B:
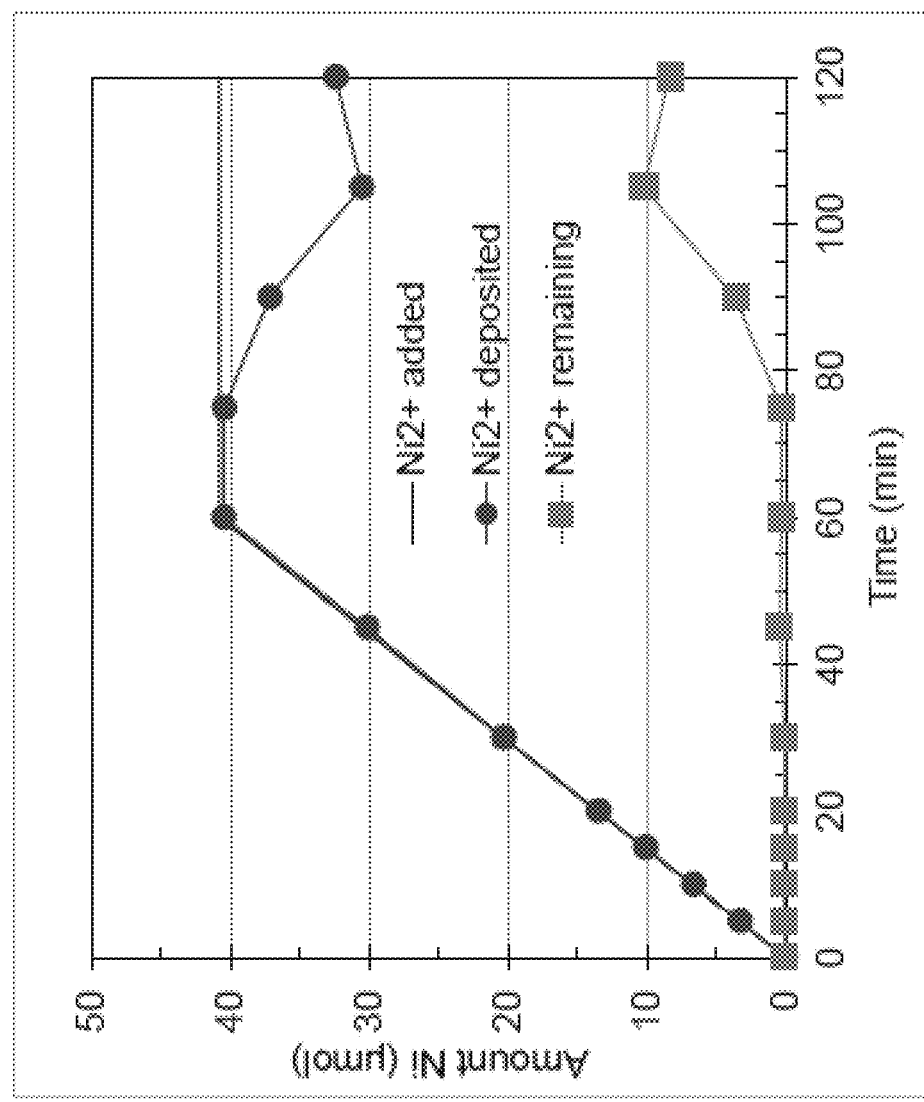
Figure 3A:
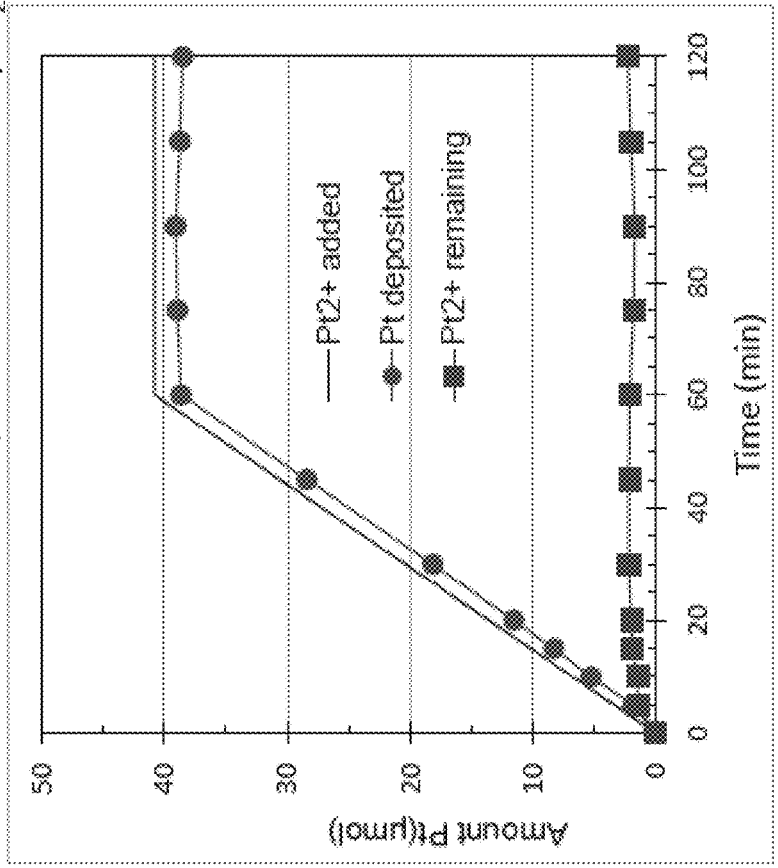
FIGS. 3A-3B illustrate graphs displaying the deposition of platinum (Pt) and nickel (Ni), respectively, according to example implementations, at a 2:1 Pt:Ni ratio.
Figure 3B:
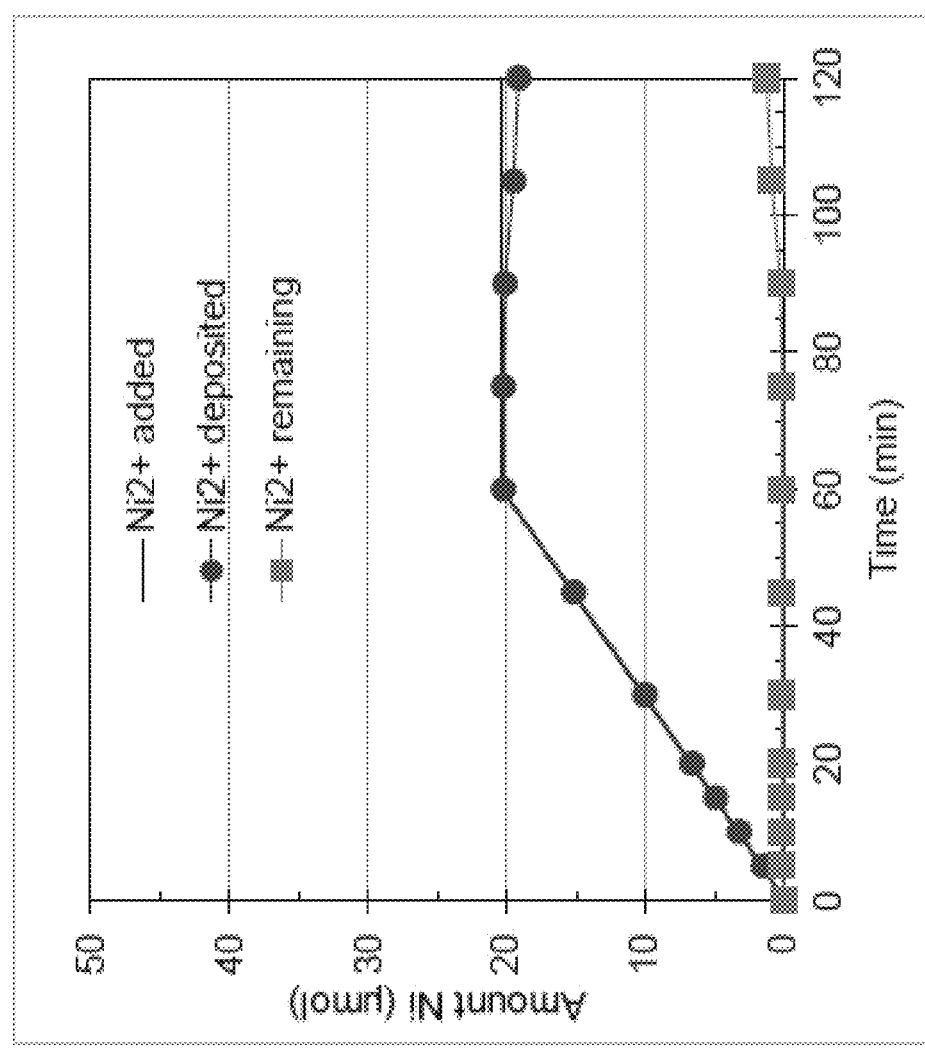
Figure 4A:
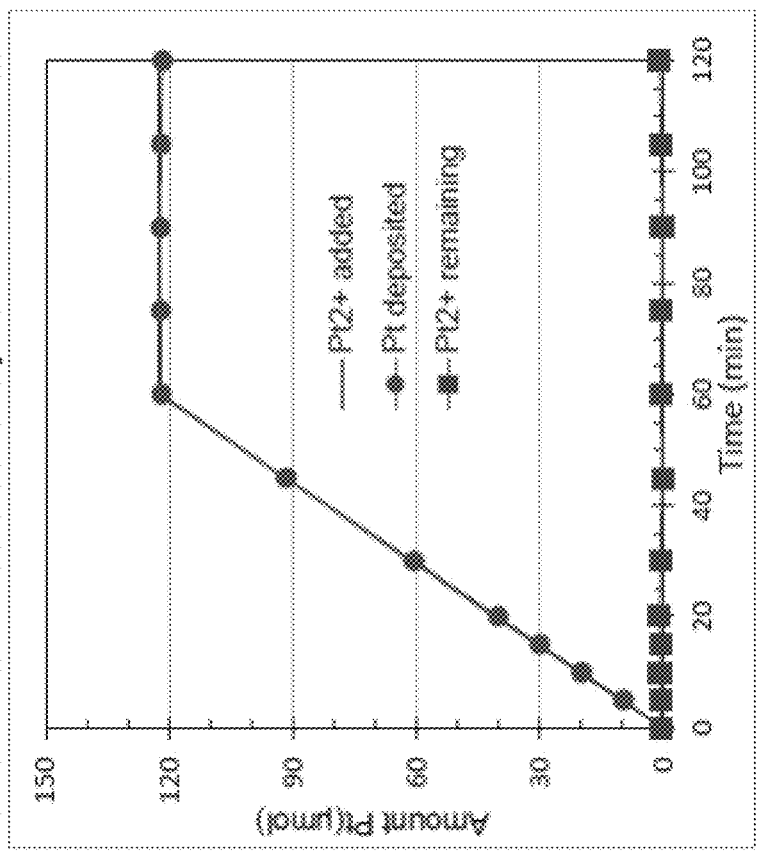
FIGS. 4A-4B illustrate graphs displaying the deposition of platinum (Pt) and nickel (Ni), respectively, according to example implementations, at a 3:1 Pt:Ni ratio.
Figure 4B:
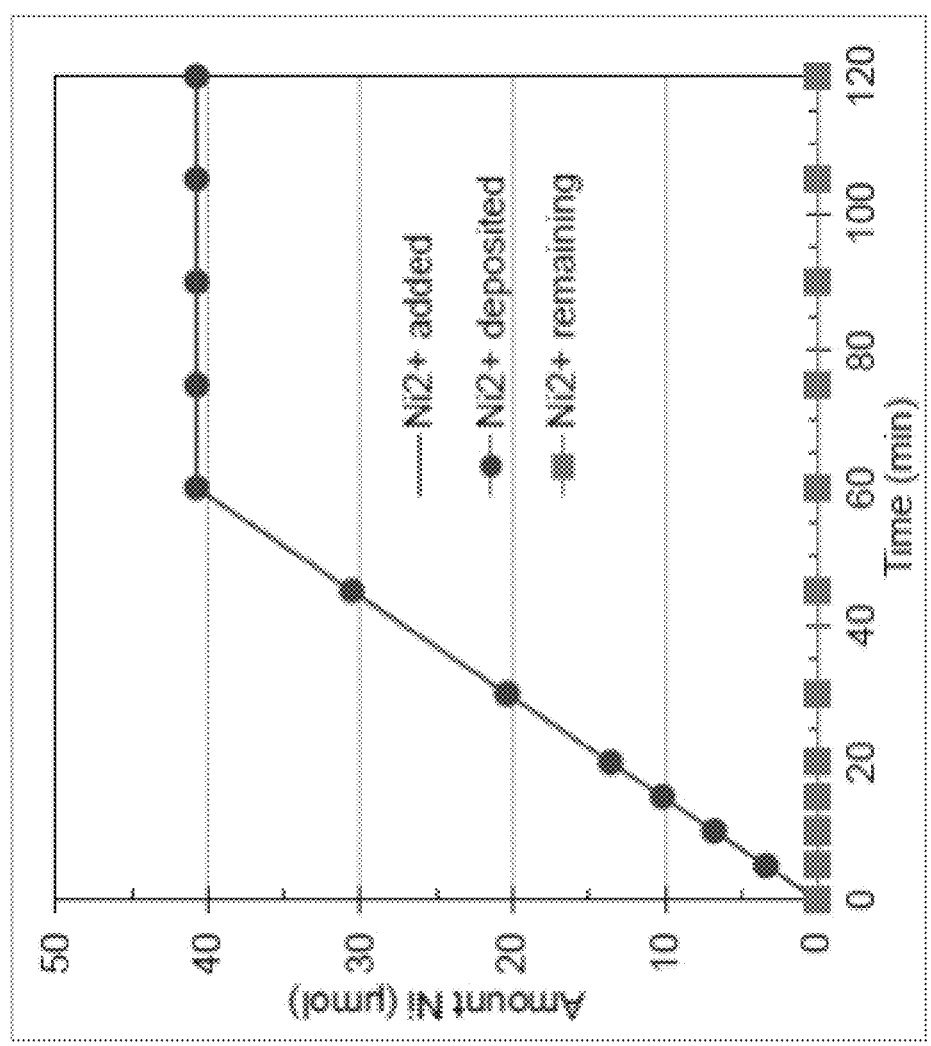
Figure 5A:
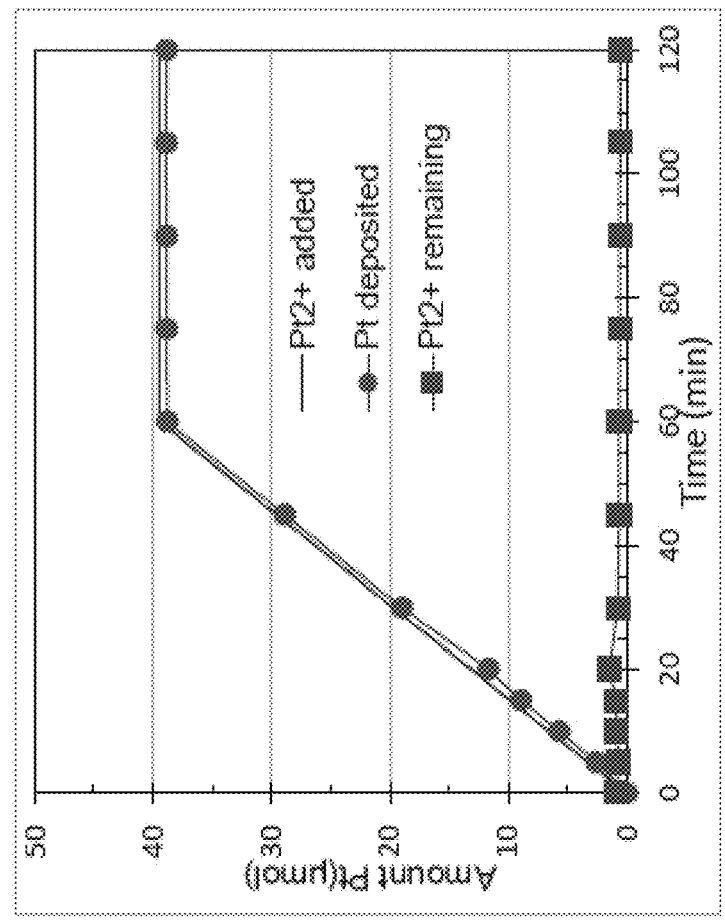
FIGS. 5A-5B illustrate graphs displaying the deposition of platinum (Pt) and cobalt (Co), respectively, according to example implementations, at a 1:1 Pt:Co ratio.
Figure 5B:
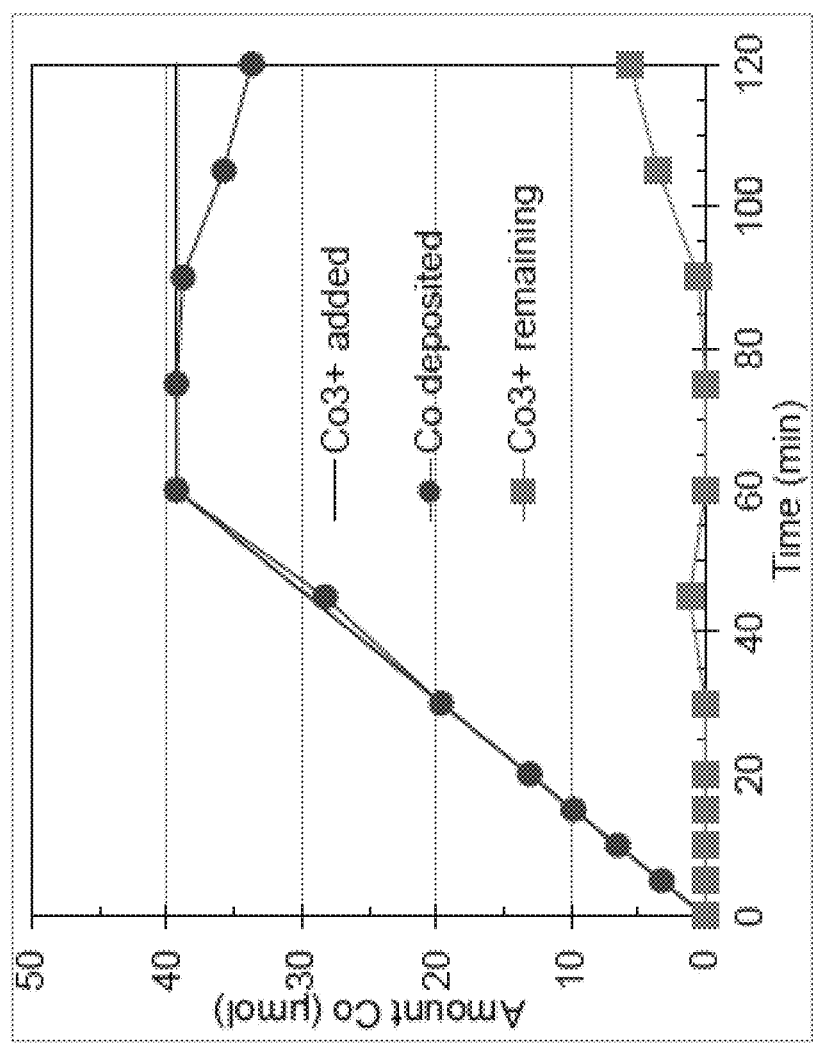
Figure 6A:
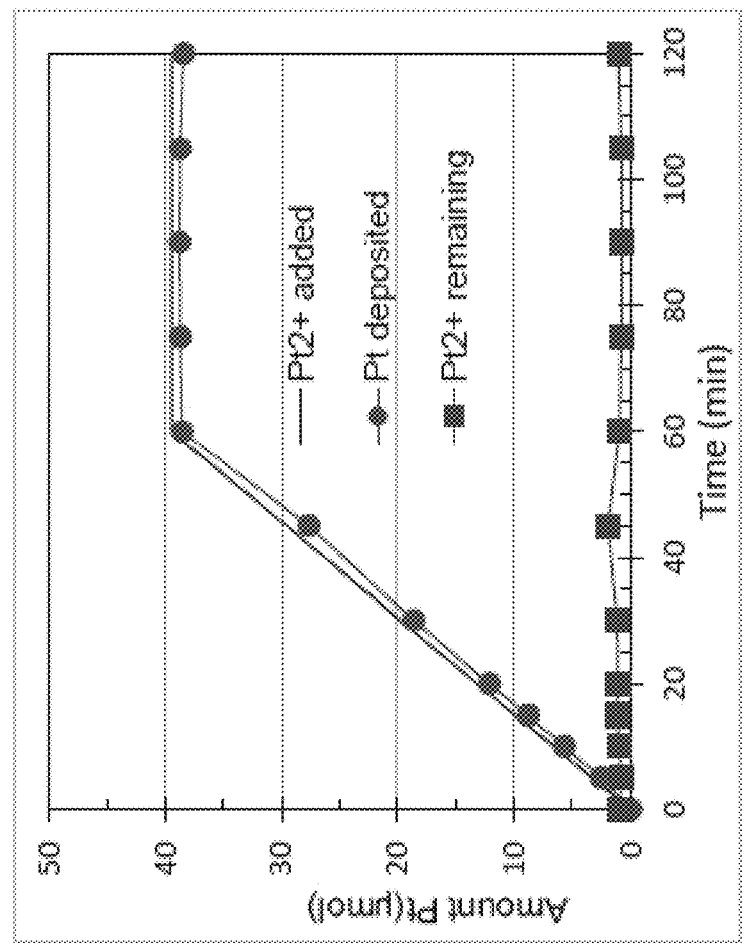
FIGS. 6A-6B illustrate graphs displaying the deposition of platinum (Pt) and cobalt (Co), respectively, according to example implementations, at a 2:1 Pt:Co ratio.
Figure 6B:
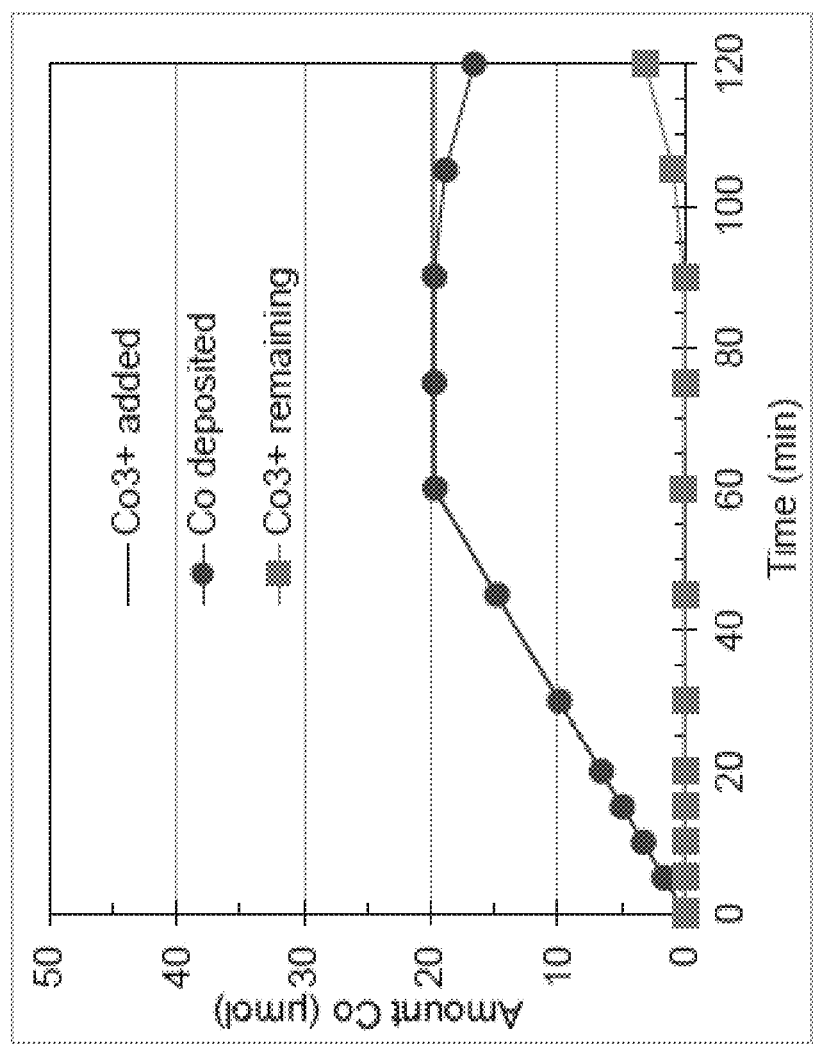
Figure 7A:
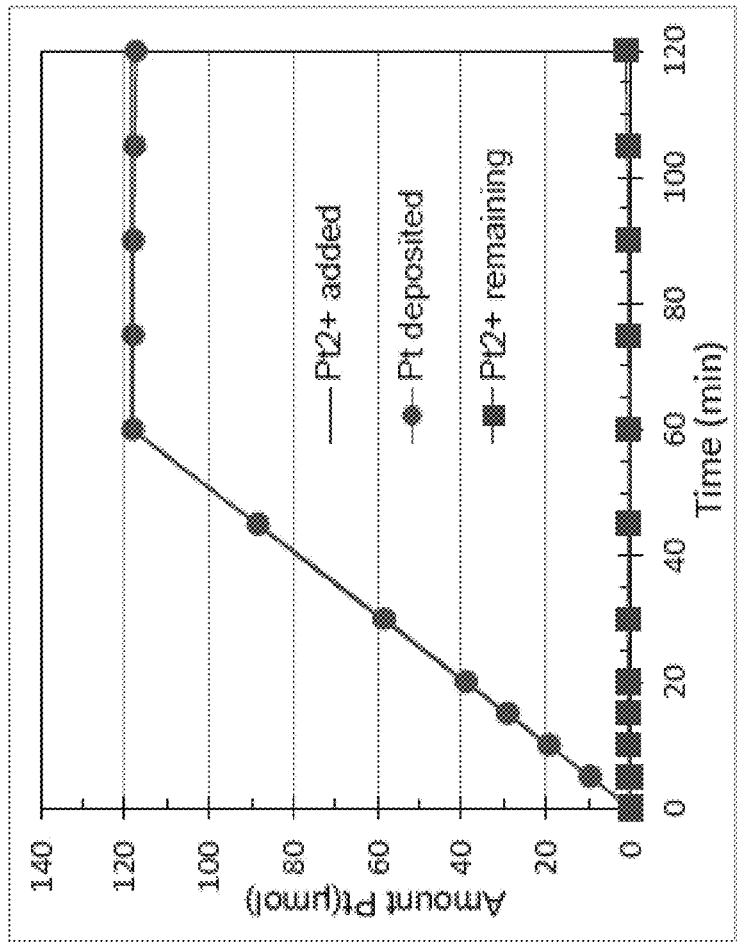
FIGS. 7A-7B illustrate graphs displaying the deposition of platinum (Pt) and cobalt (Co), respectively, according to example implementations, at a 3:1 Pt:Co ratio.
Figure 7B:
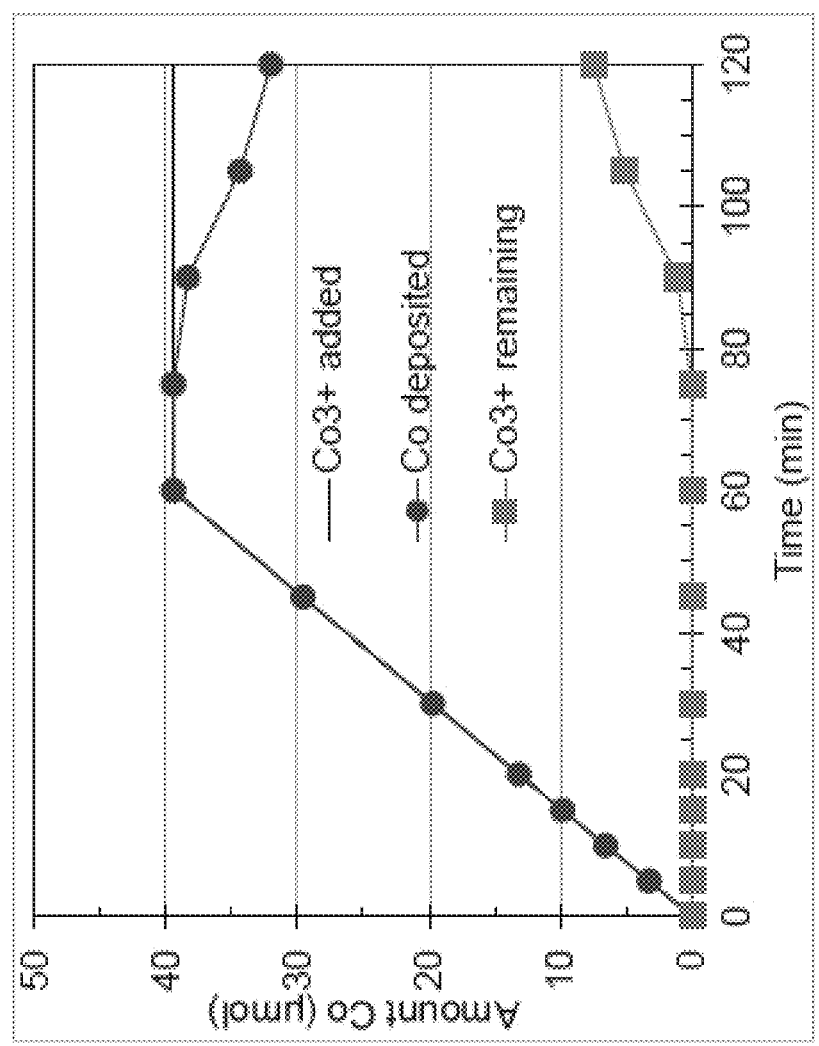
Figure 8:
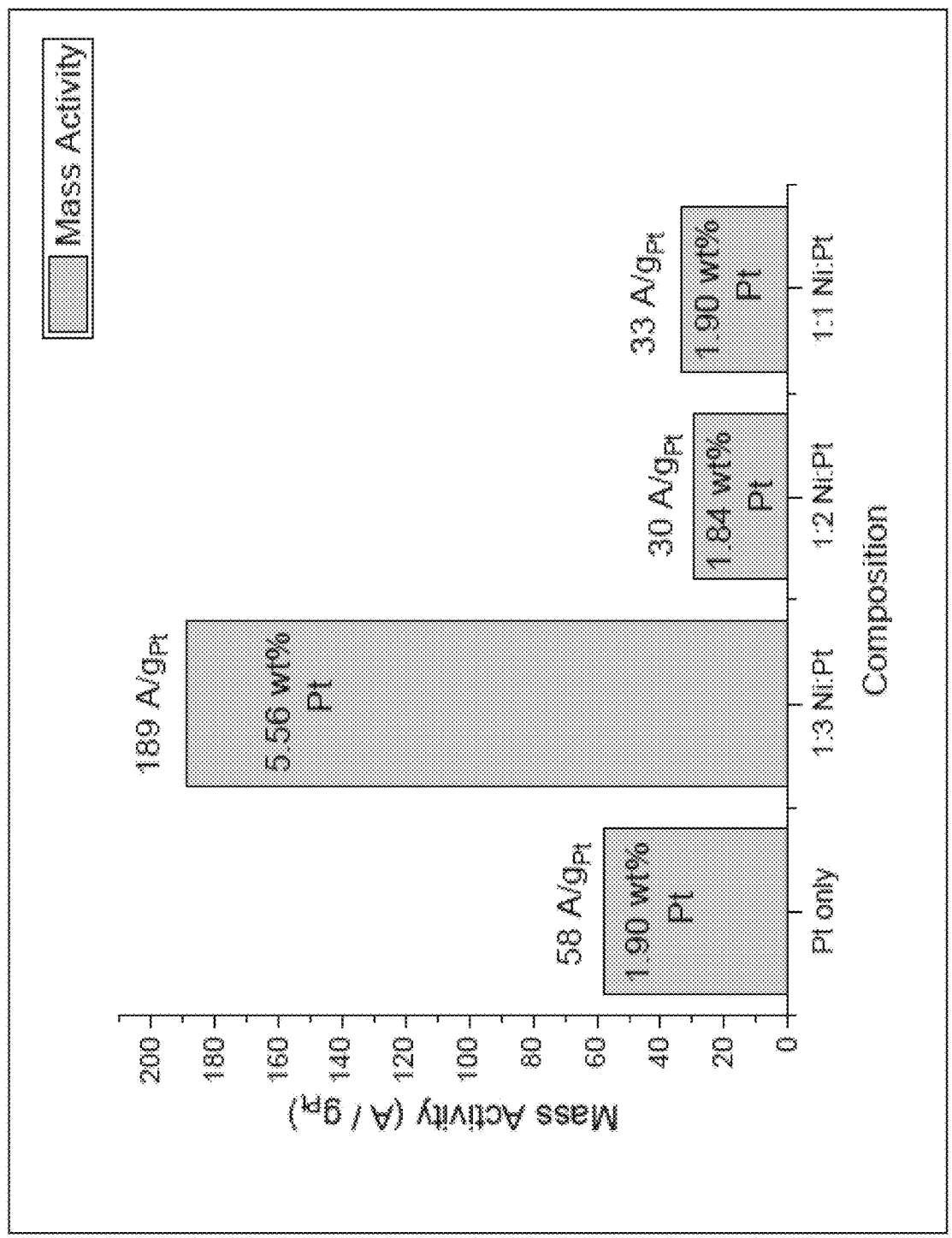
FIG. 8 illustrates a graph displaying mass activity of example systems having compositions including Ni according to the present disclosure compared to platinum only.
Figure 9:
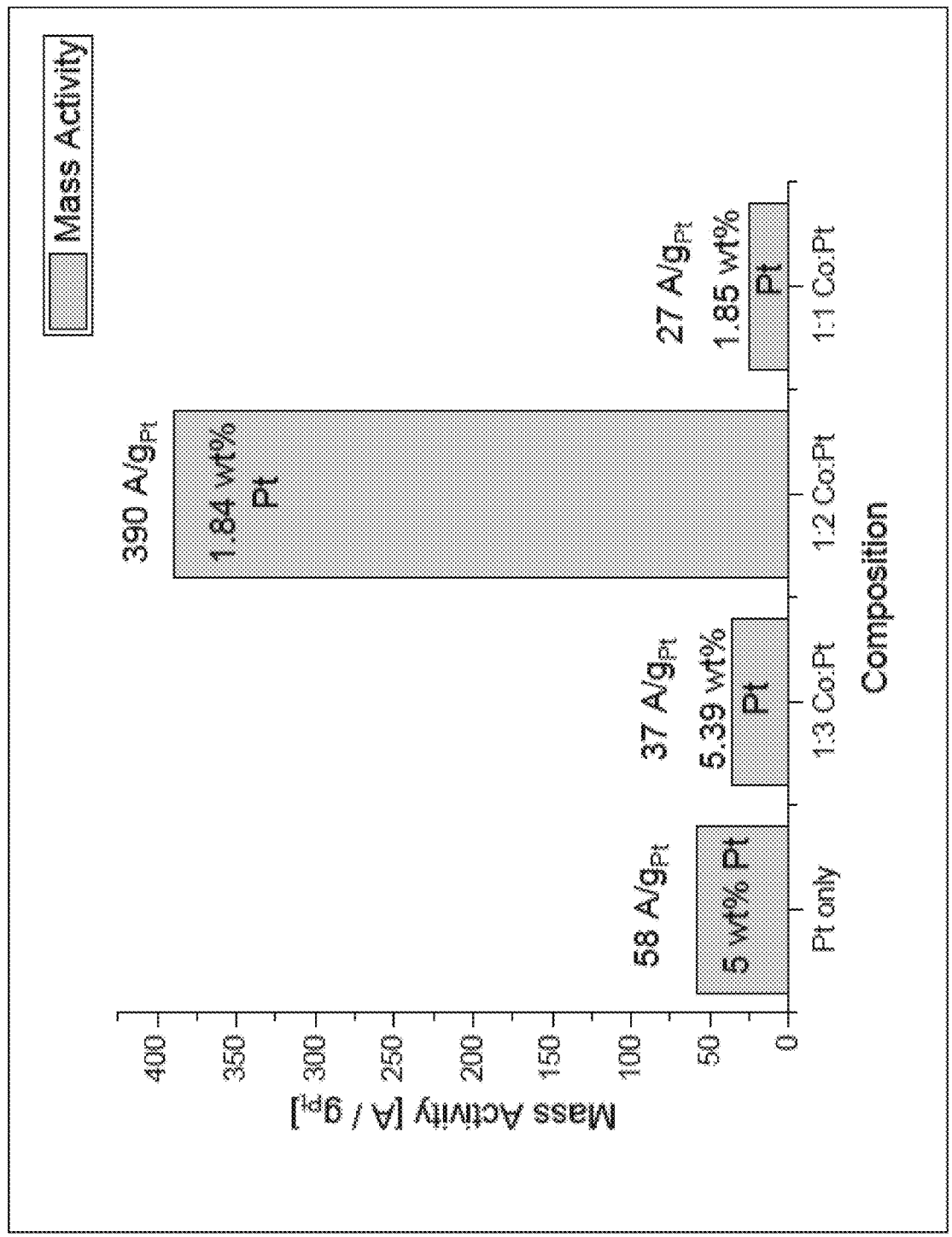
FIG. 9 illustrates a graph displaying mass activity of example systems having compositions including Co according to the present disclosure compared to platinum only.
Figure 10:
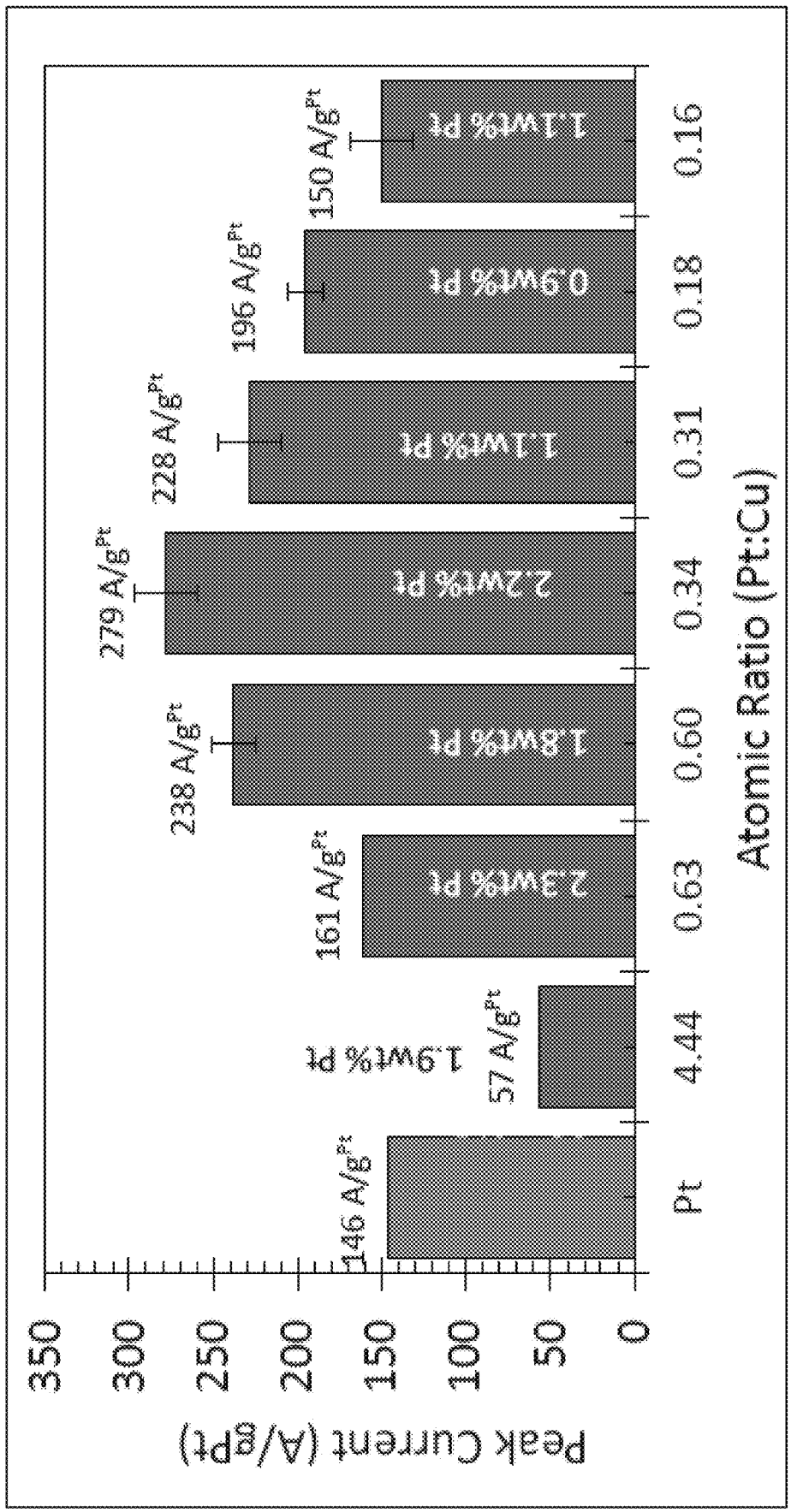
FIG. 10 illustrates a graph displaying peak current vs Pt:Cu atomic ratios of example systems having compositions including copper (Cu) according to the present disclosure compared to Pt.
Figure 11:
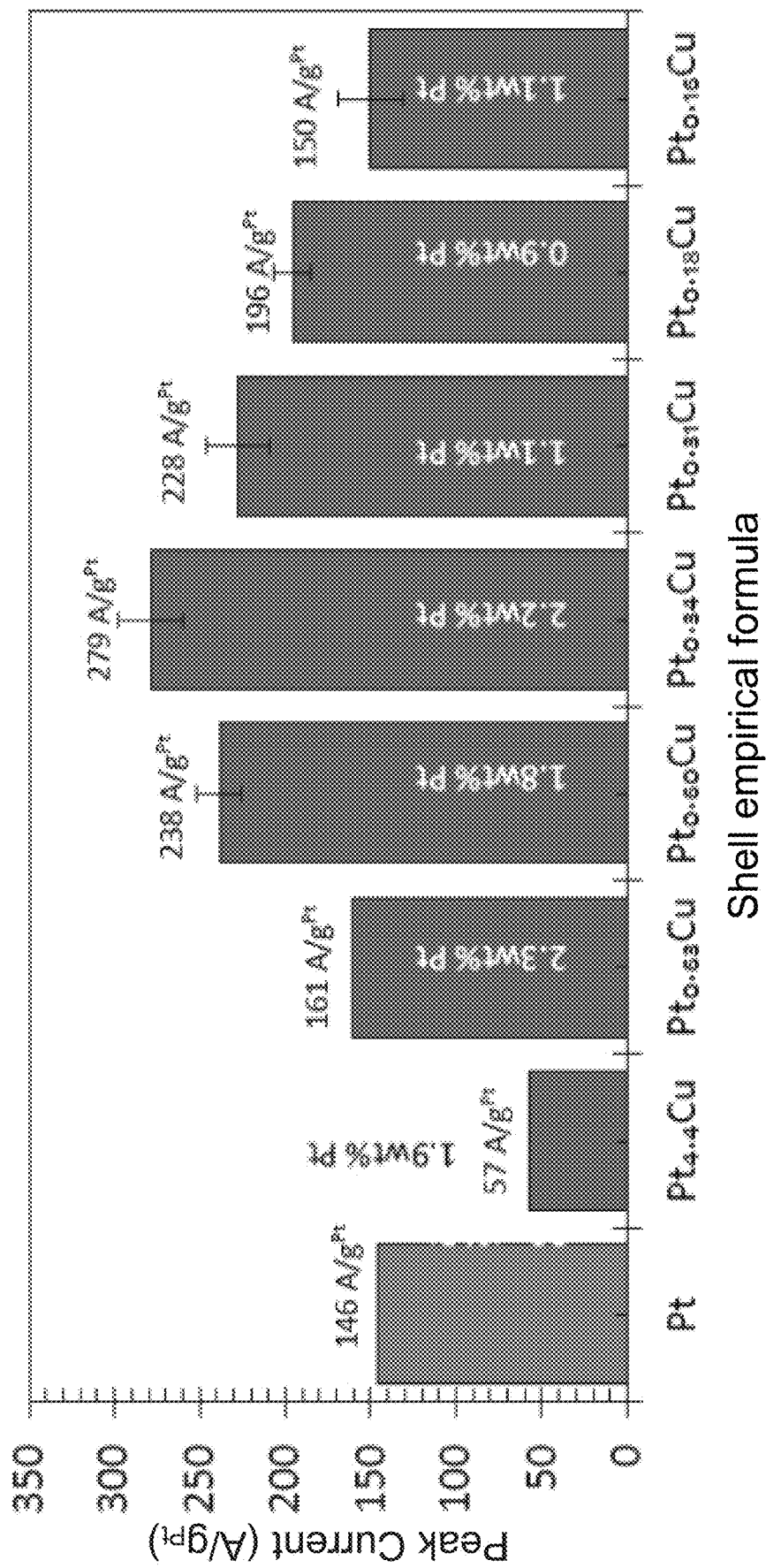
FIG. 11 illustrates a graph displaying peak current vs $Pt_mCu_n$ empirical formulae of example systems having compositions including copper (Cu) according to the present disclosure compared to Pt.
Figure 12A:
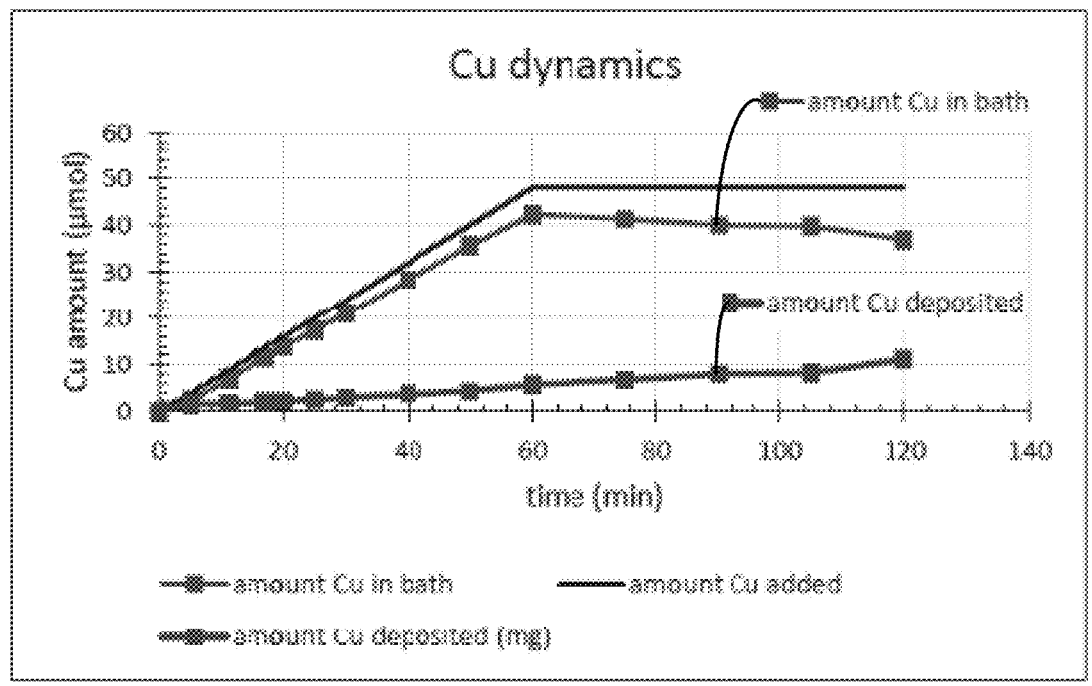
FIGS. 12A-12B illustrate graphs displaying co-deposition of Cu and Pt, respectively, according to example implementations, at a 4.4:1 Pt:Cu ratio.
Figure 12B:
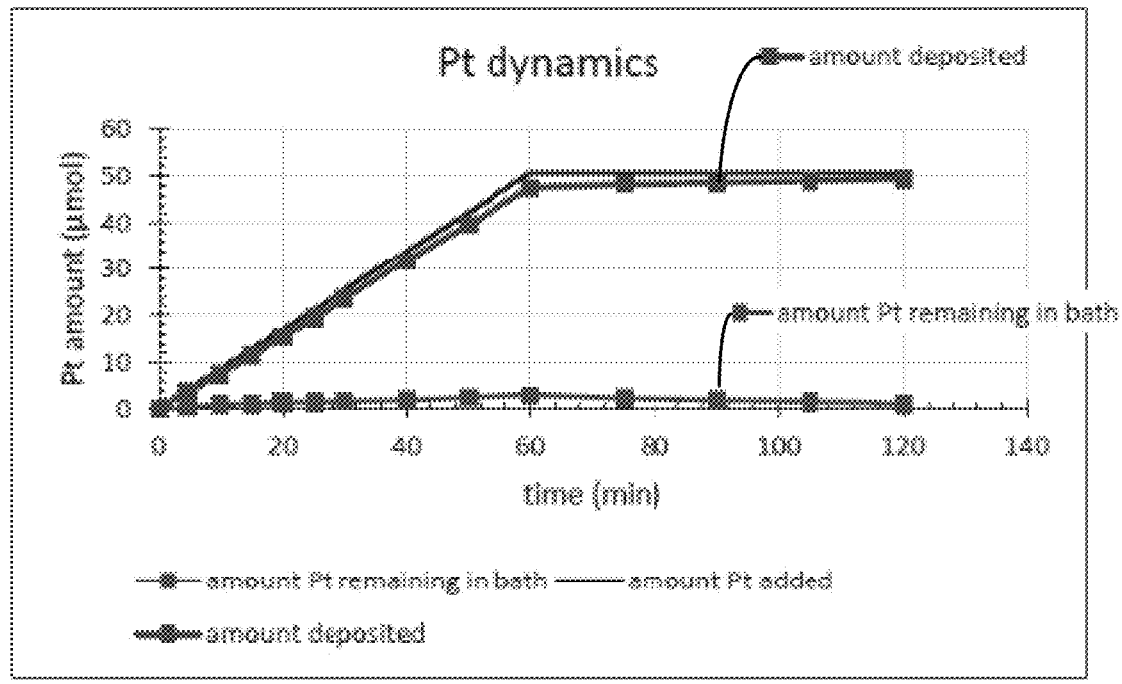
Figure 13A:
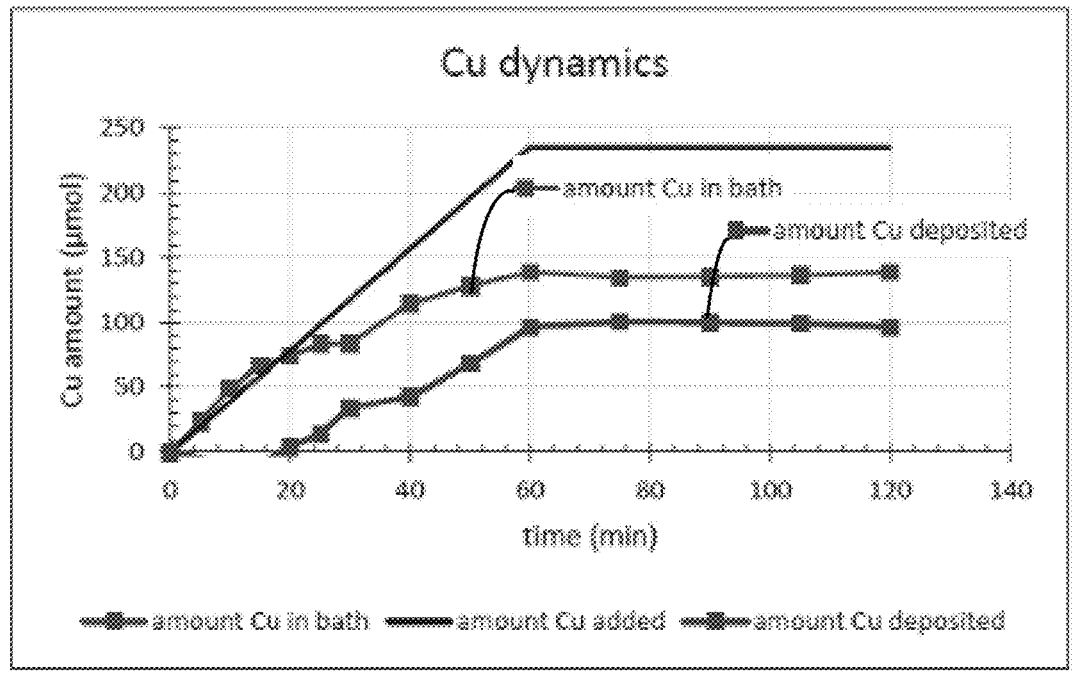
FIGS. 13A-13B illustrate graphs displaying co-deposition of Cu and Pt, respectively, according to example implementations, at a 0.63:1 Pt:Cu ratio.
Figure 13B:
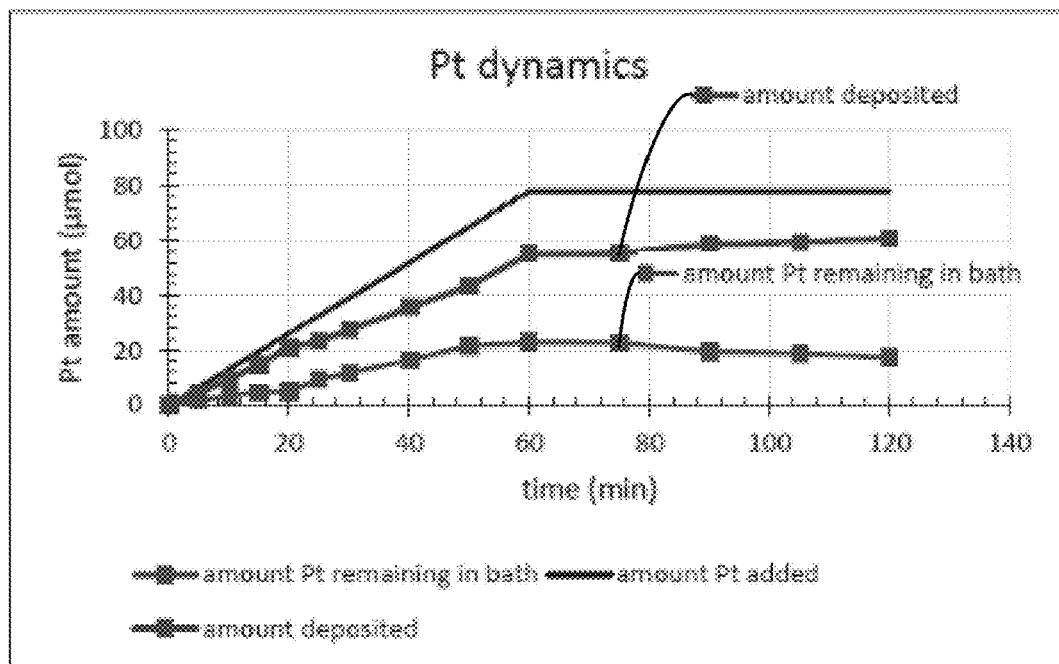
Figure 14A:
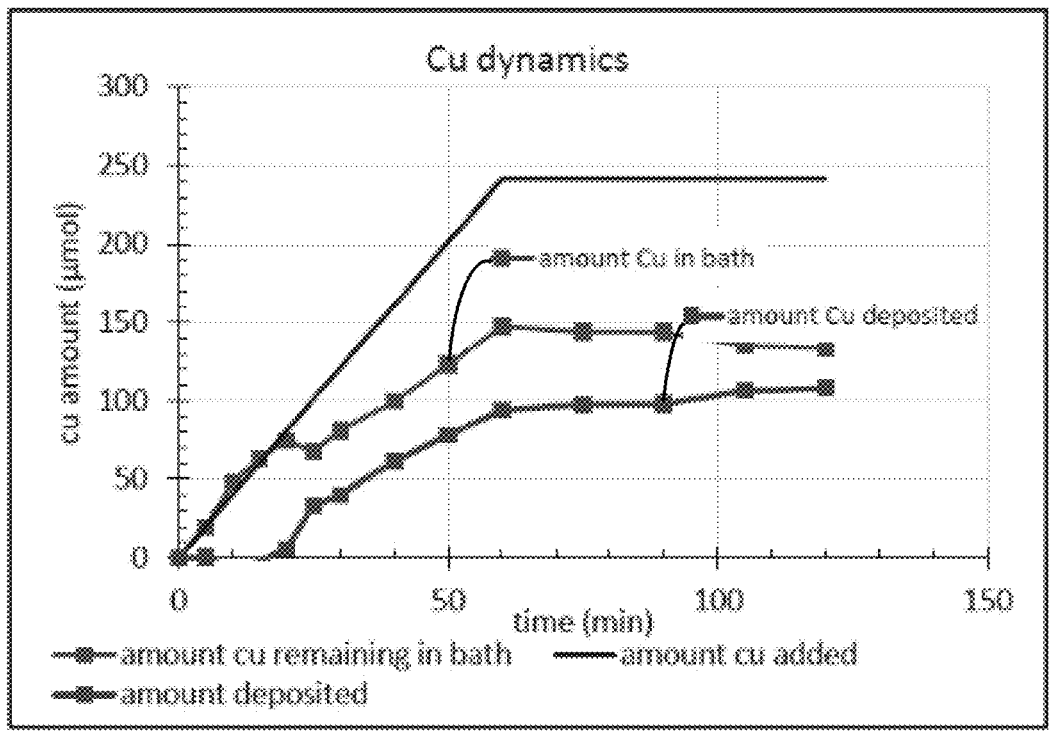
FIGS. 14A-14B illustrate graphs displaying co-deposition of Cu and Pt, respectively, according to example implementations, at a 0.34:1 Pt:Cu ratio.
Figure 14B:
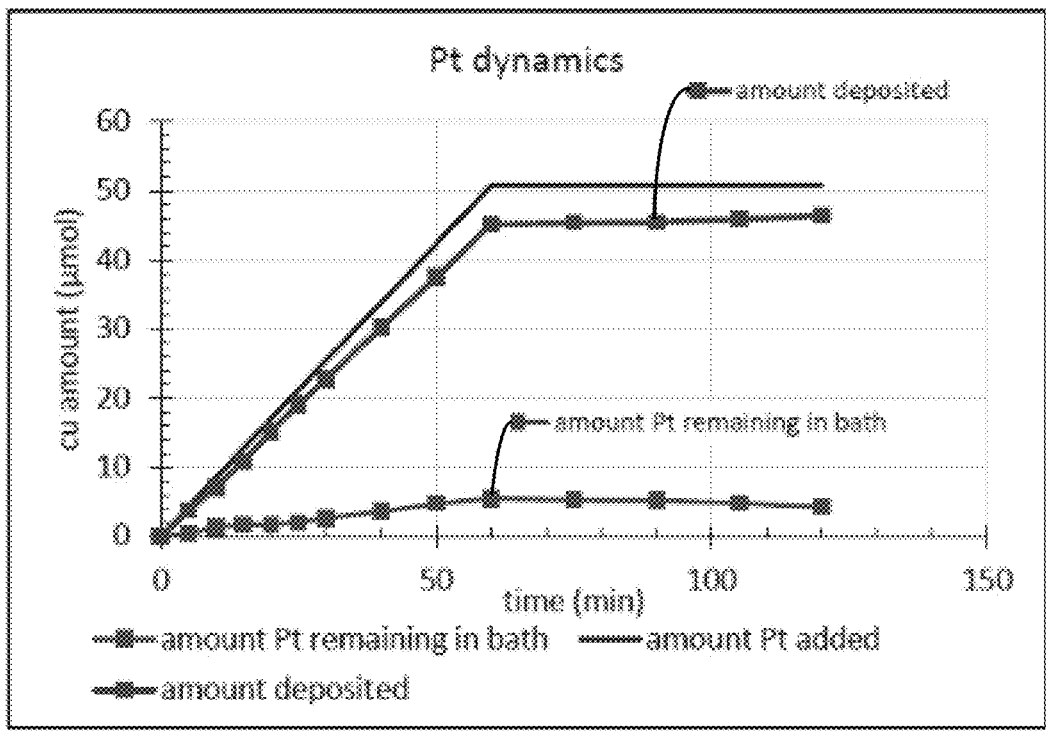
Figure 15A:
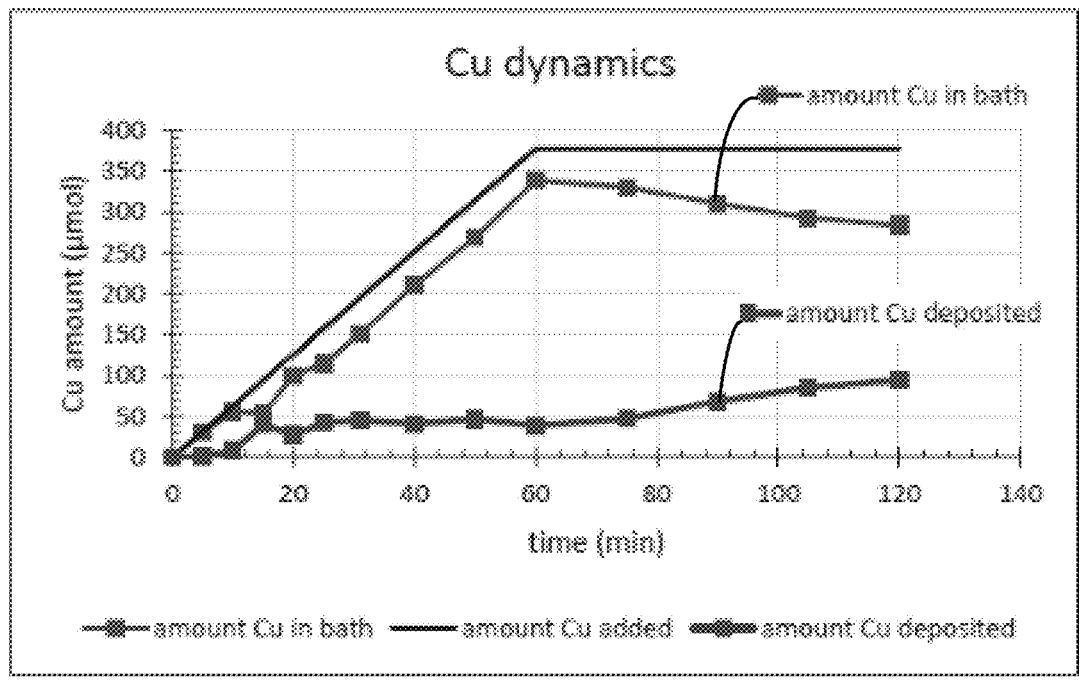
FIGS. 15A-15B illustrate graphs displaying co-deposition of Cu and Pt, respectively, according to example implementations, at a 0.31:1 Pt:Cu ratio.
Figure 15B:
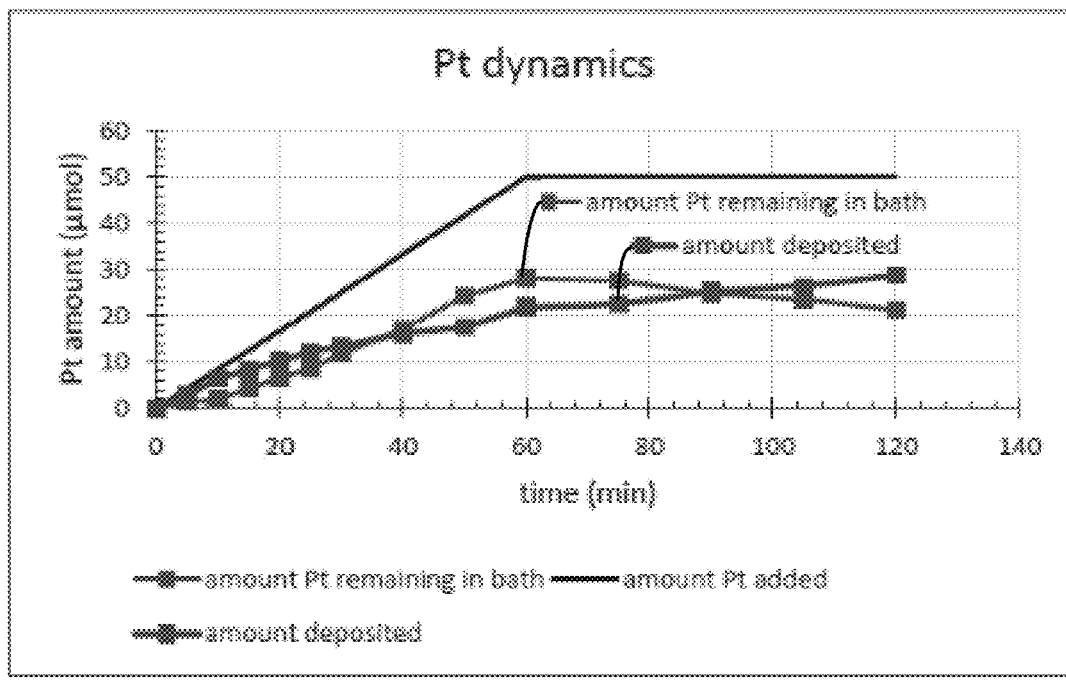
Figure 16A:
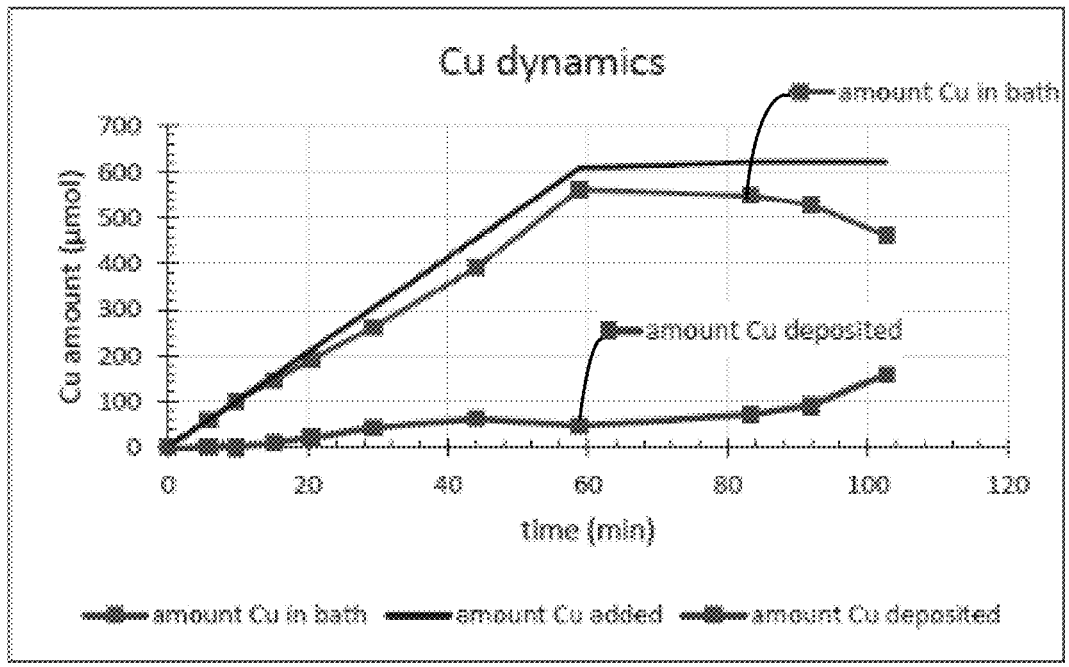
FIGS. 16A-16B illustrate graphs displaying co-deposition of Cu and Pt, respectively, according to example implementations, at a 0.18:1 Pt:Cu ratio.
Figure 16B:
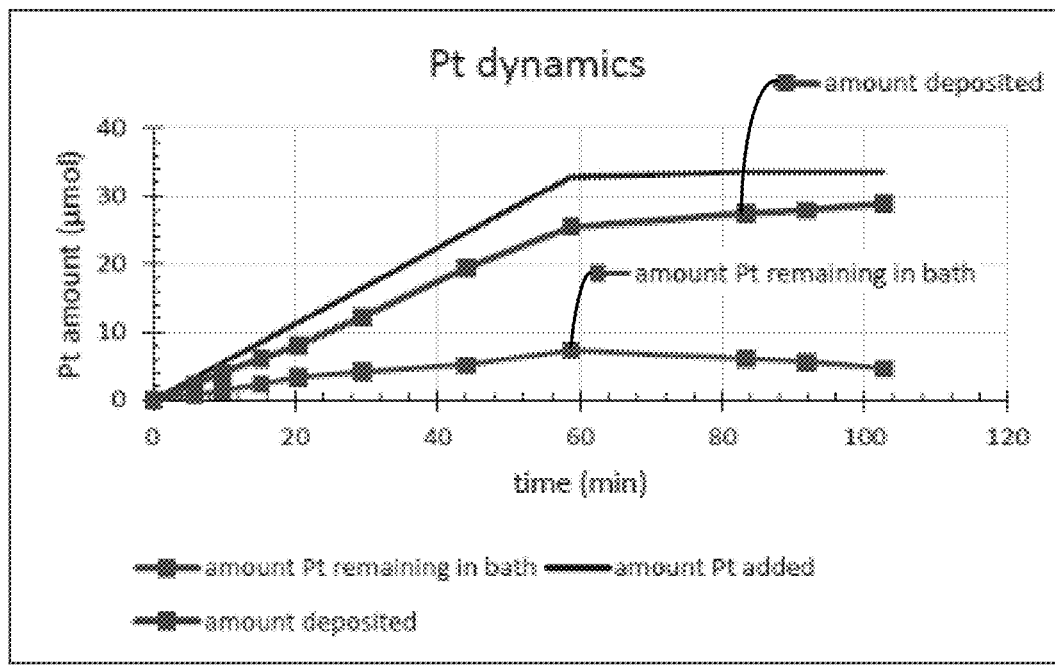
Figure 17A:
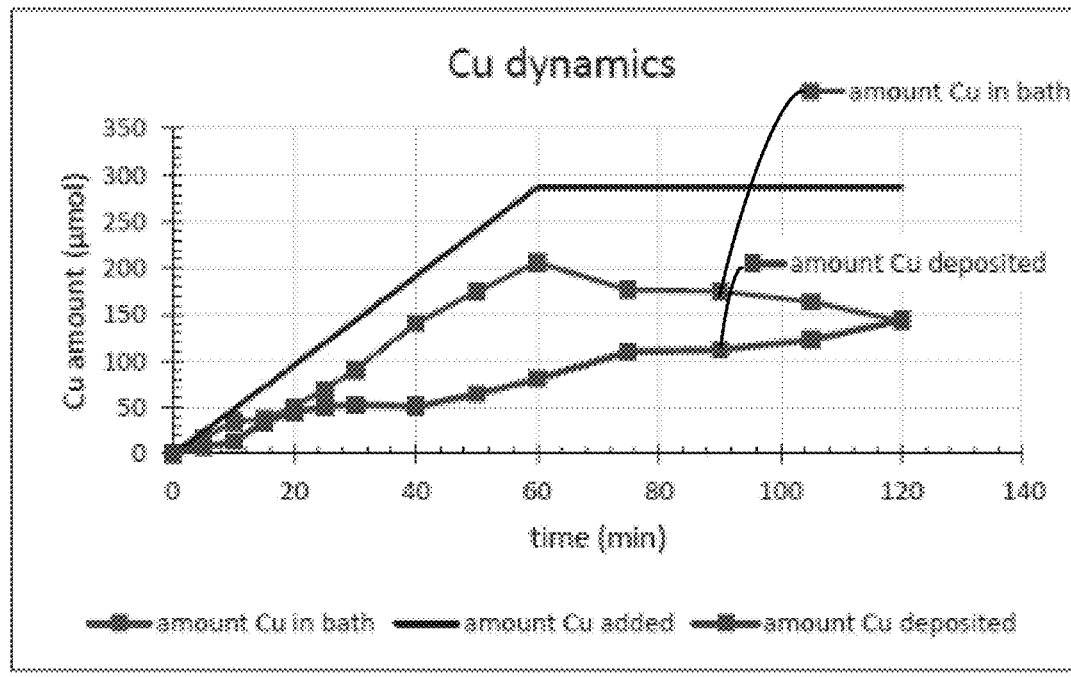
FIGS. 17A-17B illustrate graphs displaying co-deposition of Cu and Pt, respectively, according to example implementations, at a 0.16:1 Pt:Cu ratio.
Figure 17B:
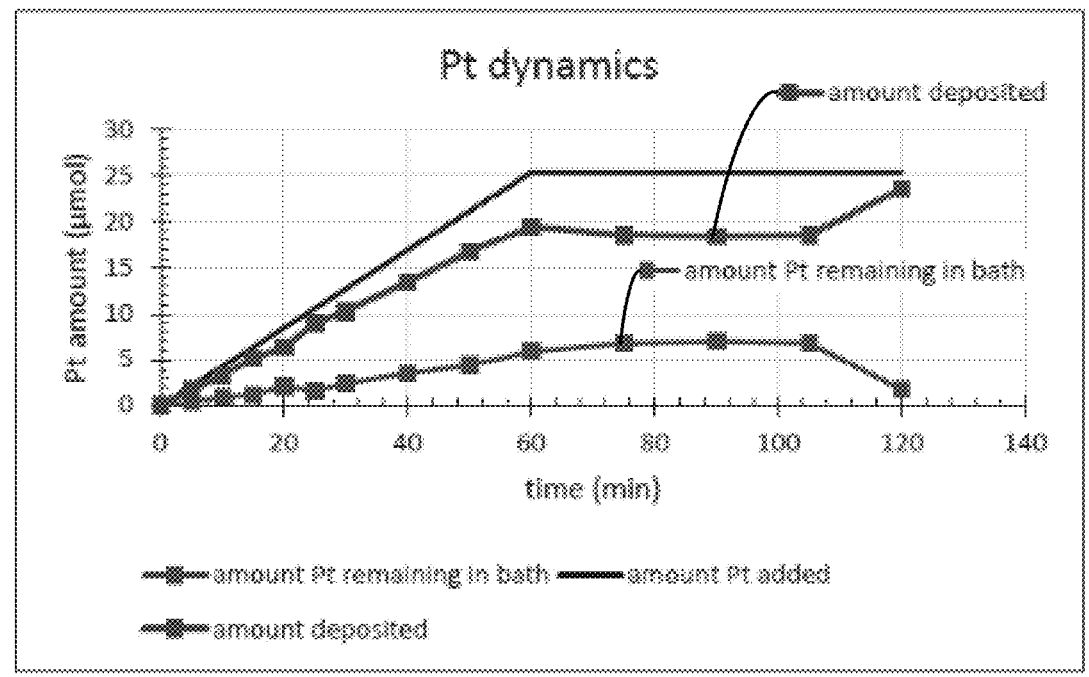

Repeat use of reference characters in the present specification and drawings is intended to represent the same or analogous features or elements of the present invention.

Figure 18:
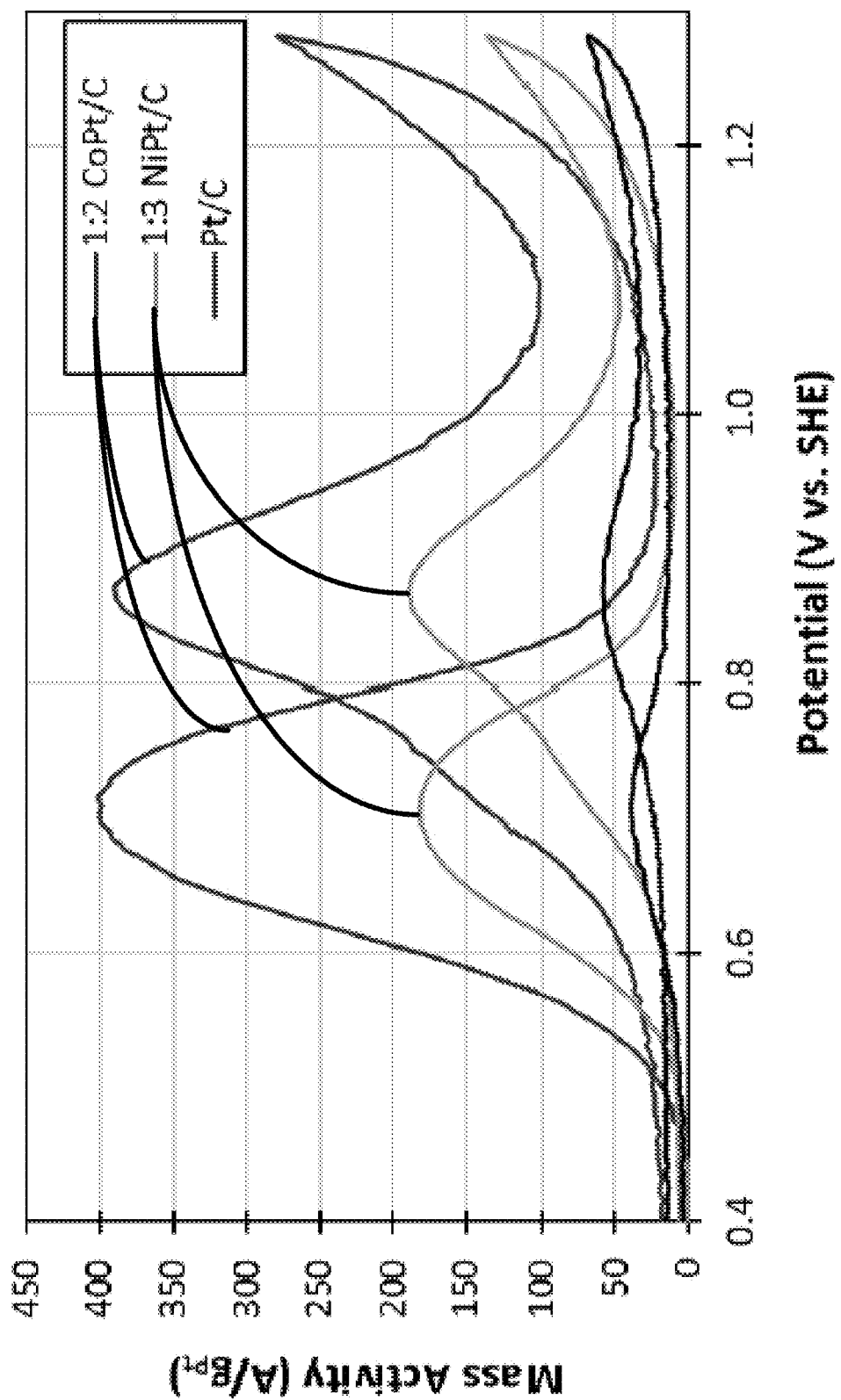

FIG. 18 illustrates cyclic voltammetry measurements for the standard Pt catalyst compared to two compositions of 2:1 Pt:Co and 3:1 Pt:Ni bimetallic catalysts according to example implementations of the present disclosure.

DETAILED DESCRIPTION

Reference now will be made to embodiments of the disclosure, one or more examples of which are set forth below. Each example is provided by way of an explanation, not as a limitation. In fact, it will be apparent to those skilled in the art that various modifications and variations can be made without departing from the scope or spirit of the disclosure. For instance, features illustrated or described as one embodiment can be used on another embodiment to yield still a further embodiment. Thus, it is intended that the present disclosure cover such modifications and variations as come within the scope of the appended claims and their equivalents. It is to be understood by one of ordinary skill in the art that the present discussion is a description of exemplary embodiments only and is not intended as limiting the broader aspects of the present disclosure, which broader aspects are embodied exemplary constructions.

Implementations according to the present disclosure include a second metal salt and a suitable Pt salt deposited on a metal core component (for implementations according to the present disclosure, the core metal can be the same as the metals being deposited or a different metal) in a supported catalyst system. Thus, example fuel cell catalysts in accordance with the disclosure generally includes a plurality of metal particles, each including a core metal and a shell metal system deposited on the core metal. The shell metal system can be formed to produce a uniform layer of Pt and one or more second metal components (e.g., by controlling the deposition rate, using different metal salts, using different ratios of metal salts, etc.). Aspects of the shell metal system can include intimate contact between platinum and the second metal such as would form in a substantially homogenous composition. In this manner, the shell metals can interact during methanol oxidation to remove adsorbed CO as $CO_2$. A wide range of bimetallic shell compositions can be used in implementations according to the present disclosure since the atomic ratios of both metals can be controlled using a process such a co-electroless deposition. For instance, the ratio of platinum to a second metal can be about 10:1 to about 0.10:1. In some implementations, the ratio is preferably about 5:1 to about 0.15:1 such as about 4:1 to about 0.18:1, about 3.5:1 to about 0.5:1, or about 2.5:1 to about 1:1. In an example implementation, the ratio can be about 1:1 to about 0.15:1, such as about 0.80:1 to about 0.18:1, about 0.65:1 to about 0.25:1, or about 0.60:1 to about 0.30:1

Importantly, this method of preparation is straightforward, versatile, and can be easily scaled for larger-scale operation. Simplicity, scalability, safety, and lower cost of metals in the DMFC fuel cell catalysts are potentially breakthrough improvements in the practical application of the present invention.

Example implementations according to the present disclosure provide compositions and methods directed to catalyst systems which include two or more surface reactive metals. An example aspect of the disclosure includes a method for forming a catalyst system using co-deposition of two or more different metal salts using a deposition technique such as electroless deposition. Aspects of the present disclosure include methods for forming a fuel cell catalyst by depositing a metal salt and a suitable platinum salt on a metal core component to produce a core-shell structure including at least two metals in the shell region (e.g., surface) of the deposited metal particles.

Another example aspect of the present disclosure includes a fuel cell catalyst formed according to methods of the present disclosure.

A further example aspect of the present disclosure includes a fuel cell including a catalyst as set forth in example embodiments of the present disclosure.

More particularly, the fuel cell catalyst generally includes a porous support having a plurality of metal particles deposited on the support. The metal particles can include a core-shell structure as described in example embodiments. Further, the shell metal system can include at least two metals, such as 2, 3, 4, 5, 6, 7, 8 or more than 8 metals.

Aspects of the porous support can include physical properties such as surface area, pore volume, average pore diameter, electrical conductivity, and other similar properties. These physical properties can be determined by a variety of methods (e.g., adsorption, microscopy, conductivity, and combinations of techniques). When used for the purpose of direct methanol fuels, it is important that the support also be electrically-conducting to provide an electron pathway from the core-shell particle to the anode collector plate or even the cathode collector plate. Carbon is a support material with suitable electron conductivity.

For instance, as a non-limiting example, Brunauer-Emmett-Teller (BET) methods can be used to determine the surface area and/or pore volume of the support at different temperatures. Average pore diameters can be determined by nitrogen adsorption/desorption isotherms and calculated using the Barrett-Joyner-Halenda (BJH) method. Both surface area and pore analyses can then be extracted from the data and analyzed.

In some example implementations, the porous support can have a surface area in the range of about of about 8 $m^2/g$ to about 500 $m^2/g$. In certain embodiments, the porous support can have a surface area in the range of about of about 10 $m^2/g$ to about 300 $m^2/g$. In some embodiments, the porous support can have a surface area in the range of about 20 $m^2/g$ to about 200 $m^2/g$. Some example embodiments may have surface areas in the range of about 30 $m^2/g$ to about 100 $m^2/g$.

Additionally, or alternatively, the porous support can have a pore volume in the range of about 20 $mm^3/g$ to about 250 $mm^3/g$. In certain implementations, the porous support can have a pore volume in the range of about 40 $mm^3/g$ to about 220 $mm^3/g$. In some implementations, the porous support can have a pore volume in the range of about 100 $mm^3/g$ to about 200 $mm^3/g$. Some example embodiments may have surface areas in the range of about 150 $mm^3/g$ to about 195 $mm^3/g$.

For certain implementations, the porous support can have an average pore diameter in the range of about 10 nm to about 50 nm. In some embodiments, the porous support can have an average pore diameter in the range of about 10 nm to about 30 nm. In some example implementations, the porous support can have an average pore diameter in the range of about 12 nm to about 20 nm. For instance, some implementations can have an average pore diameter in the range of about 12 nm to about 16 nm.

One example aspect of the porous support can include a material composition. Some example materials that can be used as the porous support include various kinds of carbon and/or a metal oxide (e.g., alumina, silica, titania, zirconia, silica-alumina, niobia or mixtures thereof. In an embodiment, the support includes carbon. The carbon support can exist as graphite, carbide, graphene, carbon nanotubes. Other example supports can be composed of materials different from metal oxides or carbon. Such supports include silicon carbide, boron nitride, and other metal nitrides.

In another example implementation, the porous support can include boron nitride, titanium dioxide, silicon carbide, silicon nitride, or combinations of these materials.

Aspects of the metal particles can include a core-shell structure. For example, the metal particles can include a core region having all or a majority of one metal (e.g., a stable metal) and a shell region located on the surface of the core region, the shell region including Pt and a second metal (e.g., at least two catalytic metals). Thus, in these embodiments, the shell region is mostly in contact with the metal in the core region rather than in contact with the support.

In certain implementations, the metal particles can include an alloy comprising a mixture of the core metal and the shell metal system. For some of these embodiments, the core metal and the shell metal system can produce a substantially homogenous alloy particle. In other embodiments, the particle composed of the core metal and the shell metal system can segregate into 2 or more phases that can include the core metal, the shell metal system, and an alloy.

An embodiment of the disclosure can include a catalyst system including a porous support deposited with a plurality of metal particles, each metal particle including a core metal and a shell metal system. In such embodiments, the shell metal system can include platinum having a Pt weight percent (wt %) relative to the catalyst weight. In some implementations, the Pt weight percent can be about 1.0 to about 60.0, such as about 2.0 to about 40.0, 3.0 to about 25.0, or about 5.0 to about 20.0.

Another example aspect of such systems can include a core metal weight percentage. (wt %) relative to the catalyst weight. In some implementations, the core metal weight percent can be about 1.0 to about 60.0, such as about 2.0 to about 40.0, 3.0 to about 20.0, or about 4.0 to about 10.0.

In general, different transition metals can be used to produce embodiments of the metal particles. Several example metals that can be used to form the core metal and/or one of the components of the shell metal system are shown in Table 1.

TABLE 1

Metals and Metal Properties

| Metal | Melting Point (° C.) | Surface Energy (ergs/cm$^2$) |
|---|---|---|
| Ag | 962 | 1302 |
| Au | 1064 | 1626 |
| Cu | 1083 | 1934 |
| Pd | 1554 | 2043 |
| Ni | 1453 | 2364 |
| Pt | 1772 | 2691 |
| Co | 1495 | 2709 |
| Rh | 1966 | 2828 |
| Mo | 2617 | 2877 |
| Fe | 1535 | 2939 |
| Nb | 2468 | 2983 |
| Re | 3180 | 3109 |
| Ir | 2410 | 3231 |
| Ru | 2310 | 3409 |
| W | 3410 | 3468 |

In some example implementations according to the disclosure, the core metal preferably, but is not limited to, a metal with a higher surface energy than at least one metal in the shell metal system. For example, the shell metal system includes Pt; thus, some example core metals can include one or more of Co, Rh, Mo, Fe, Re, Ir, Ru, or W. However, implementations according to the present disclosure can also include a second metal in the shell metal system such as Co, Ni, Cu, or Ag. In these implementations the second metal can act to reduce the surface energy of the shell metal system; thus, example core metals can further include Cu, Ag, Au, Pd, Ni, and Pt.

For instance, a fuel cell catalyst as disclosed herein can include a support having a plurality of metal particles that have a metal core including Pd, and a shell metal system including Pt and one or more of Co, Ni, Cu, or Ag. In certain implementations, the metal particles can be bimetallic. As defined herein, a bimetallic particle contains only two metals from Table 1.

In some implementations, the metal particles can include an alloy composed of the core metal, Pt, and a second metal.

In some of these implementations, the core metal and the shell metal system can produce a substantially homogenous alloy particle. In other embodiments, the particle composed of the core metal and the shell metal system can segregate into 2 or more phases that can include: the core metal, Pt, the second metal, and an alloy. For these embodiments, the alloy may be produced by co-deposition of two or more metal salts. Further, in such implementations, the second metal and the core metal can be the same or different. As a non-limiting example implementation, the fuel cell catalyst can include a porous support containing metal particles having a core-shell arrangement. The material for the porous support includes carbon black (C) and the metal particles can include a core containing Pd, and a shell metal system including Pt and Ni.

Another example embodiment of the disclosure includes a fuel cell having a fuel cell catalyst in accordance with the present disclosure. Aspects of fuel cells in accordance with the present disclosure include performance properties such as mass activity and peak current. In general, integrated peak areas at 0.85V can be used to determine mass activity for catalysts. For instance, the mass activity ($A/g_{Pt}$) where A=amps of current and the peak current ($A/g_{Pt}$) of example fuel cells according to the present disclosure can range from 150 to about 400 $A/g_{Pt}$. Example embodiments may demonstrate activities that are 3-6 times higher than catalysts that only include platinum in the shell metal system.

For implementations in accordance with the present disclosure, the porous support can include a variety of materials. A non-limiting list of example materials that can be used as the porous support include various kinds of carbon and/or a metal oxide (e.g., alumina, silica, titania, zirconia, silica-alumina, niobia, or mixtures thereof). In an embodiment, the support includes carbon. The carbon support can exist as graphite, carbide, graphene, carbon nanotubes. Other supports can be composed of materials different from metal oxides or carbon. Such supports include silicon carbide, boron nitride, silicon nitride and other metal nitrides.

Another embodiment of the disclosure can include a method of forming a fuel cell catalyst by depositing a plurality of metal particles, each metal particle including a core metal and a shell metal system on a porous support. In such embodiments, the core metal is generally deposited first, followed by depositing the shell metal system. Alternatively, or additionally, the core metal and one or more components of the shell metal system can be deposited at substantially the same time or can be deposited as an alloy. Using different deposition rates and/or concentrations, the weight percentage and position of the core metal and the shell metal system can be systematically varied. As an example, the shell metal system can be co-deposited (e.g., using a solution containing Pt and a second metal ion) at a deposition rate and over a deposition time to produce a Pt weight percent (wt %) on the support and a second metal weight percent on the support. In some embodiments, the deposition rate and/or deposition time can be controlled so that the Pt weight percent and the second metal weight percent on the support are approximately the same. For example, a method for forming the fuel cell catalyst can include preparing one solution containing a Pt salt and a second solution containing a second metal salt, and then using controlled addition of each metal salt along with a solution containing a satisfactory reducing agent. One example aspect of the solution can include a solution pH. In some implementations, the solution can have a basic pH, such as a pH between about 7.25 to about 12, about 7.5 to about 10, or about 8 to about 8.5. Another example aspect of the solution can include a temperature. Deposition temperatures can depend on the types of metal salts and various temperatures can be used. In general, implementations can use temperatures between about 10 to 100° C., about 20 to 90° C., or about 25 to 70° C.

Methods of forming the fuel cell catalyst can also include embodiments for formation of the porous support. As an example, preparation can include forming the support material into a pellet or other structure characterized by a porosity, surface area, pore volume, and average pore diameter. The material used to form the pellet can be purchased from a supplier or can be synthetically produced. In these embodiments, the raw material (e.g., BN) can be purchased as a powder. Formation of the pellet can be performed using known methods, such as wet extrusion followed by drying. In some embodiments, the material can be molded or formed into a monolith structure. In any of these embodiments, the raw material can be mixed with a suitable solvent to form a slurry. In certain embodiments, the slurry can also include one or more binders. The slurry is then formed into a structure and heated and/or pressed to produce the support.

As another example, the fuel cell catalyst can be formed from a support powder obtained from a vendor (e.g., Alfa Aesar, Strem Chemicals, and Sigma). In some embodiments, the support powders can be calcined in air at a temperature (e.g., 800° C.) for a time (e.g., 8 hours) prior to deposition of the metal particles onto the support powder. Following deposition of the metal particles, the support powder having deposited metal particles can be pressed in a die at pressures between about 1,000 psig to about 22,000 psig to form pellets of a desired size, such as between about 0.06 to about 1.0 inch in length.

Embodiments of the disclosure include fuel cell catalysts and methods to produce fuel cell catalysts that can encompass a variety of forms. A non-limiting list of forms includes: particles, monoliths, and shaped or extruded forms such as spheres, pellets, rings, noodles. In certain embodiments, these forms can be optimized or adapted to different fuel cells or fuel cell applications to adjust hydrodynamic flow, providing embodiments with improved or increased exposure of the metal particles to fluid-phase reactants.

The above descriptions are provided, by way of example, for producing fuel cell catalysts having different forms and are not meant to limit the scope of dimensions, shapes, and processes that can be practiced in embodiments disclosed herein.

In embodiments of the disclosure, the deposition of metal particles or components of metal particles (e.g., a core metal and/or a shell metal system) can be accomplished by a variety of techniques such as wet impregnation, incipient wetness, deposition-precipitation, reduction deposition, ion exchange, strong electrostatic adsorption, and combinations of the same. Further, certain embodiments of the disclosure may utilize electroless deposition (ED) to control the shape and or arrangement of the core metal and/or the shell metal system.

As an example, a combination of deposition methods can be used to deposit a plurality of metal particles having a core-shell arrangement. In these embodiments, the deposition of the metal core preferably occurs first, and can be accomplished any of the techniques above. Deposition of the metal shell preferably occurs second and in one embodiment, the metal shell can be deposited using ED.

Electroless deposition of core-shell arrangements, as may be utilized in some embodiments, is described in U.S. Pat. No. 10,016,751, the entirety of which is incorporated herein by reference. The methods and materials provided in this disclosure demonstrate embodiments which display improvements for fuel cell catalysts using co-deposition or Pt and a second metal to produce a shell metal system.

The improvements provided in this disclosure demonstrate advantages for methanol fuel cells in the conversion of methanol to carbon dioxide. However, other fuel cell applications, electronic applications (e.g., solar cells), or optical applications may be realized through practice of example embodiments. Thus, while described throughout in relation to fuel cell catalysts, implementations of the present disclosure are not solely constrained to fuel cell catalysts or only to fuel cell catalysts for methanol fuel cells.

The invention claimed is:

1. A fuel cell catalyst comprising:
   a. a porous support; and
   b. a plurality of metal particles deposited on the porous support,
   wherein each of the metal particles comprises a core metal and a shell metal system, and wherein the shell metal system is deposited on the core metal, and wherein the shell metal system comprises Pt and a second metal, and wherein a ratio of Pt to the second metal is about 5:1 to about 0.15:1.

2. The fuel cell catalyst of claim 1, wherein the porous support has a surface area in a range of about 10 m$^2$/g to about 500 m$^2$/g.

3. The fuel cell catalyst of claim 1, wherein the porous support has a pore volume in a range of about 40 mm$^3$/g and about 220 mm$^3$/g.

4. The fuel cell catalyst of claim 1, wherein the porous support has an average pore diameter in a range of about 10 nm to about 40 nm.

5. The fuel cell catalyst of claim 1, wherein the porous support comprises boron nitride, titanium dioxide, silicon carbide, silicon nitride, or combinations thereof.

6. The fuel cell catalyst of claim 1, wherein the second metal comprises one or more of: Co, Cu, Ni, Ag, Au, or combinations thereof.

7. The fuel cell catalyst of claim 1, wherein the core metal comprises one or more of: Pd, Co, Cu, Ni, Ir, Rh, Mo, Fe, Pt, Re, Ru, W, or combinations thereof.

8. The fuel cell catalyst of claim 1, wherein each of the metal particles comprise an alloy, and wherein the alloy includes a substantially homogenous distribution of the core metal and the shell metal system.

9. The fuel cell catalyst of claim 1, wherein each of the metal particles are bimetallic, and wherein the core metal is Pd and the second metal comprises one of: Co, Cu, or Ni.

10. A methanol fuel cell comprising the fuel cell catalyst of claim 1, wherein the methanol fuel cell displays has a mass activity of about 100 to about 400 A/g$_{Pt}$.

11. The methanol fuel cell of claim 10, wherein the second metal comprises Ni, and wherein the methanol fuel cell displays a mass activity of about 160 to about 200 A/g$_{Pt}$.

12. The methanol fuel cell of claim 10, wherein the second metal comprises Co, and wherein the methanol fuel cell displays a mass activity of about 160 to about 200 A/g$_{Pt}$.

13. The methanol fuel cell of claim 10, wherein the second metal comprises Co, and wherein the methanol fuel cell displays a mass activity of about 100 to about 400 A/g$_{Pt}$.

14. The methanol fuel cell of claim 10, further comprising a rotating disk electrode comprising the fuel cell catalyst.

15. The methanol fuel cell of claim 14, further comprising an electrolyte solution comprising sulfuric acid.

\* \* \* \* \*